United States Patent
Jain et al.

(10) Patent No.: US 11,941,559 B2
(45) Date of Patent: Mar. 26, 2024

(54) SYSTEM AND METHOD FOR PROJECT GOVERNANCE AND RISK PREDICTION USING EXECUTION HEALTH INDEX

(71) Applicant: Genpact Luxembourg S.à r.l. II, Luxembourg (LU)

(72) Inventors: Roma Jain, Ghaziabad (IN); Neeti Sukhtankar, Karnataka (IN); Mandira Anand, Bangalore (IN); Devashree Bhattacharya, Noida (IN)

(73) Assignee: Genpact USA, Inc., New York, NY (US)

( * ) Notice: Subject to any disclaimer, the term of this patent is extended or adjusted under 35 U.S.C. 154(b) by 1 day.

(21) Appl. No.: 17/409,536

(22) Filed: Aug. 23, 2021

(65) Prior Publication Data
US 2023/0065424 A1    Mar. 2, 2023

(51) Int. Cl.
*G06Q 10/06* (2023.01)
*G06Q 10/0631* (2023.01)
(Continued)

(52) U.S. Cl.
CPC .......... *G06Q 10/063114* (2013.01); *G06Q 10/06313* (2013.01); *G06Q 10/06315* (2013.01);
(Continued)

(58) Field of Classification Search
CPC ..... G06Q 10/063114; G06Q 10/06313; G06Q 10/06315; G06Q 10/0635; G06Q 10/0637; G06Q 10/06393; G06N 20/00
See application file for complete search history.

(56) References Cited

U.S. PATENT DOCUMENTS 6,715,130 B1   3/2004   Fiche et al.
8,108,238 B1   1/2012   Cassone et al.
(Continued)

FOREIGN PATENT DOCUMENTS

CA   2988936 A1 *   2/2018   ............. G06F 9/451
EP   2610796 A1     7/2013

OTHER PUBLICATIONS

Ajoudanian S, Abadeh MN. Recommending human resources to project leaders using a collaborative filtering-based recommender system: Case study of gitHub. IET Software. Oct. 2019;13(5):379-85. (Year: 2019).*

(Continued)

*Primary Examiner* — Hamzeh Obaid

(57) ABSTRACT

A method for automatically assessing project health and providing persona-based recommendations to improve the project health is provided. In some embodiments, the method includes identifying a set of metrics to be monitored for a project; calculating different levels of scores based on the set of metrics, each score being a health indicator of the project; analyzing the different levels of scores; identifying different levels of actions corresponding to the different levels of scores, an action being taken to improve an improvement area of the project; determining a user role of a user; identifying and providing a type of analytic view for the user based on the user role and analyzing the different levels of scores; and notifying the user to take the action corresponding to a level of scores based on the user role.

20 Claims, 20 Drawing Sheets

(51) Int. Cl.
  *G06Q 10/0635* (2023.01)
  *G06Q 10/0637* (2023.01)
  *G06Q 10/0639* (2023.01)

(52) U.S. Cl.
  CPC ..... *G06Q 10/0635* (2013.01); *G06Q 10/0637* (2013.01); *G06Q 10/06393* (2013.01)

(56) References Cited

U.S. PATENT DOCUMENTS

| | | | |
|---|---|---|---|
| 8,401,893 B1 | 3/2013 | Heuler et al. | |
| 9,672,488 B1 | 6/2017 | Heuler et al. | |
| 11,232,383 B1* | 1/2022 | Burns, Sr. | G06Q 10/0637 |
| 2009/0138321 A1* | 5/2009 | Henby | G06Q 10/06313 |
| | | | 705/7.38 |
| 2010/0010830 A1 | 1/2010 | Dai | |
| 2011/0054968 A1* | 3/2011 | Galaviz | G06Q 10/10 |
| | | | 705/7.41 |
| 2012/0011077 A1 | 1/2012 | Bhagat | |
| 2012/0102450 A1* | 4/2012 | Choudhary | G06F 8/77 |
| | | | 717/101 |
| 2013/0086495 A1* | 4/2013 | Guzansky | G06Q 20/00 |
| | | | 715/762 |
| 2013/0173327 A1 | 7/2013 | Lance et al. | |
| 2013/0212582 A1 | 8/2013 | Mazzoleni et al. | |
| 2014/0025411 A1* | 1/2014 | Chee | G06Q 10/063 |
| | | | 705/7.11 |
| 2015/0012324 A1* | 1/2015 | Lance | G06Q 10/06313 |
| | | | 705/7.23 |
| 2015/0112770 A1 | 4/2015 | Phillips | |
| 2016/0055455 A1 | 2/2016 | Hill et al. | |
| 2016/0210571 A1* | 7/2016 | Amundson | G06Q 10/06313 |
| 2016/0260044 A1* | 9/2016 | Sabet | G06Q 10/06398 |
| 2016/0335260 A1* | 11/2016 | Convertino | G06F 16/2358 |
| 2016/0371614 A1* | 12/2016 | Weatherley-White | |
| | | | G06Q 40/06 |
| 2017/0147960 A1* | 5/2017 | Jahagirdar | G06Q 10/06313 |
| 2017/0169367 A1 | 6/2017 | Chakrabarti | |
| 2018/0005161 A1* | 1/2018 | Cong | G06Q 10/06398 |
| 2018/0082024 A1 | 3/2018 | Curbera et al. | |
| 2018/0349817 A1* | 12/2018 | Goel | G06Q 10/0635 |
| 2018/0374010 A1 | 12/2018 | Burde et al. | |
| 2019/0108471 A1* | 4/2019 | Widanapathirana | |
| | | | G06Q 10/063118 |
| 2020/0233662 A1* | 7/2020 | Bissonette | G06Q 10/0635 |
| 2020/0364645 A1* | 11/2020 | De La Hoz | G06Q 10/06398 |
| 2020/0387919 A1* | 12/2020 | Palhares Piva | G06F 16/9537 |
| 2021/0012266 A1* | 1/2021 | Stenning | G06Q 10/06398 |
| 2021/0374831 A1* | 12/2021 | Hudson | G06N 5/04 |
| 2022/0113988 A1* | 4/2022 | Swvigaradoss | G06F 9/4494 |
| 2022/0129804 A1* | 4/2022 | Dooley | G06Q 10/0635 |

OTHER PUBLICATIONS

Bao Y, Li H. Machine learning paradigm for structural health monitoring. Structural Health Monitoring. Jul. 2021;20(4):1353-72. (Year: 2021).*

Quality Metrics, "Quality Metrics (/patents/initiatives/quality-metrics-1)," USPTO, Apr. 18, 2018, last modified Aug. 21, 2019.

* cited by examiner

Calculate an EHI

| Engineering Metrics | Value A | Value B | Value C | Value D | Value E | Final Formula | Scale 1-3 | Weightage |
|---|---|---|---|---|---|---|---|---|
| Quality | | | | | | | | |
| Defect Removal Effectiveness (DRE) | | | 357 | 1109 | | 32.2% | 1 | 5% |
| Open defects Trend | 27 | 191 | 736 | 151 | 200 | 406.15 | 1 | 20% |
| Defect Density | 27 | 191 | 736 | 151 | 2000 | 20% | 1 | 20% |
| Pre-Production Defect Escape Ratio (ER) | | | 758 | 2063 | | 36.7% | 1 | 5% |
| Production Defect Escape Ratio (ER) | | | 8 | 2063 | | 0.4% | 3 | 15% |
| Defect Bounce Ratio (BR) | | | 131 | 247 | | 34.7% | 1 | 15% |
| Security Status | 1 | 5 | 7 | 3 | 2000 | 0.4% | 1 | 5% |
| Unit Test Code Coverage | 31% | | | | | 31% | 1 | 15% |
| Overall Quality Indicator | | | | | | | 1.30 | |

Figure 8

| Engineering Metrics | Weightage | LCL | UCL | Score | Scale 1-3 | Score | Scale 1-3 |
|---|---|---|---|---|---|---|---|
| Quality | | | | | | | |
| Defect Removal Effectiveness(DRE) | 5% | 70% | 90% | 32.2% | 1 | 49.8% | 1 |
| Open defects Trend | 20% | | | 406.15 | 1 | 206 | 1 |
| Defect Density | 20% | 50% | 20% | 20.3% | 1 | 88.8% | 1 |
| Pre-Production Defect Escape Ratio(ER) | 5% | 20% | 10% | 36.7% | 1 | 23.8% | 1 |
| Production Defect Escape Ratio(ER) | 15% | 10% | 3% | 0.4% | 3 | 1.0% | 1 |
| Defect Bounce Rate(BR) | 15% | 15% | 5% | 34.7% | 1 | 17.3% | 1 |
| Security Status | 5% | | | 0.4% | 1 | 0.5% | 3 |
| Unit Test Code Coverage | 15% | 70% | 85% | 31.0% | 1 | NA | |
| Quality Summary | | | | | 1.3 | | 1.1 |
| Agile | | | | | | | |
| Product roadmap availability | 50% | | | 100.0% | 3 | 100.0% | 3 |
| Velocity Trend | 10% | 75% | 90% | 109.1% | 3 | 96.2% | 3 |
| Story Point Completion Ratio(SCR) | 10% | 65% | 85% | 35.2% | 1 | 82.1% | 2 |
| Alignment with Product roadmap | 30% | 75% | 90% | 47.3% | 1 | | |
| Agile Summary | | | | | 2.2 | | 2.6 |
| Automation (CI/CD) | | | | | | | |
| Sanity test case Automation | 45% | 90% | 100% | 61.9% | 1 | 0 | 0 |
| Regression test case Automation | 40% | 50% | 75% | 26.6% | 1 | 0 | 0 |
| CI/CD Automation | 15% | | | 0.0% | 0 | 0 | |
| Automation Summary | | | | | 1.0 | | 0 |
| Release | | | | | | | |
| Alignment to the Published Release plan | 100% | | | 1 | 1 | 3 | 3 |
| Release Summary | | | | | 1 | | 3 |
| Process | | | | | | | |
| Agile Maturity Index | 100% | | | 2 | 2 | 2.0 | 2.0 |
| Process Summary | | | | | 2 | | 2 |

Figure 9

| EHI | Quality | Scope | Schedule | Automation | Agility | Improvement/Risk Areas |
|---|---|---|---|---|---|---|
| Proj1 1.5 | 1.3 | 2.2 | 1.0 | 2.0 | 1.0 | Reduce Defect Bounce rate |
| Proj2 1.9 | 1.1 | 3 | 0.0 | 2.0 | 3.0 | New module has much larger defects than expected. Team is focused on addressing quality issues during stabilization phase (May first half) |

Figure 10

SYSTEM AND METHOD FOR PROJECT GOVERNANCE AND RISK PREDICTION USING EXECUTION HEALTH INDEX

TECHNICAL FIELD

This disclosure relates to a method and system for automatically assessing project health and providing persona-based recommendations to improve the project health.

BACKGROUND

As technology, market landscape, and customer needs are increasingly changing, product (e.g., software) delivery methods have evolved. For example, many organizations have moved to agile product management and other new methodologies to create roadmaps and deliver software. However, the challenge remains as to how enterprises can consistently deliver new software within committed budgets, timelines, and required quality standards. Also, risk and delay controls for projects, i.e., different stages of product lifecycle such as development, implementation, etc., are challenging. The resource availability, changes in requirements, changes in schedules, software quality and testing, financial overruns, etc. that may introduce risks in the projects need to be monitored and tracked.

While traditional methods of monitoring and tracking the development lifecycle collect and report data, these methods are usually designed to meet the needs of specific users (e.g., project managers) in an organization, which are not convenient and efficient for other users in the organization. Some existing methods only track data at release milestones rather than performing continuous delivery tracking (e.g., daily, sprints). Some existing methods provide subjective reporting but not data driven reporting and tracking.

Hence, there is a need for a new approach for monitoring, tracking and analyzing data, and recommending timely corrective actions, which measures the project execution health as well as complimenting the current new ways of delivering software.

SUMMARY

To address the aforementioned shortcomings, a method and a system for automatically assessing project health and providing persona-based recommendations to improve the project health is provided. In some embodiments, the method includes identifying a set of metrics to be monitored for a project; calculating different levels of scores based on the set of metrics, each score being a health indicator of the project; analyzing the different levels of scores; identifying different levels of actions corresponding to the different levels of scores, an action being taken to improve an improvement area of the project; determining a user role of a user; identifying and providing a type of analytic view for the user based on the user role and analyzing the different levels of scores; and notifying the user to take the action corresponding to a level of scores based on the user role.

In some embodiments, the method includes collecting data of the project based on the set of metrics; customizing each metric associated with each parameter based on the collected data; and calculating a value for each metric associated with each parameter. The method includes specifying a scale for normalizing each metric associated with each parameter; normalizing the value of each metric to the scale; specifying a weight for each metric associated with each parameter; and calculating a composite score for each parameter. The method also includes specifying a weight for each parameter and calculating the EHI based on the weights and the composite scores for each parameter. The method further includes receiving a user input on the analytic view; populating a new view based on the user input; and receiving a response from the user in the new view, the response related to a recommendation of project health. The method also expands or reduces the set of metrics based on a dynamic change of the project requirements. The method further identifies the improvement area of the project based on analyzing the different levels of scores.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

FIG. 8 is a table illustrating the calculation of metric values and a parameter score for a project, according to some embodiments.

FIG. 9 is a table comparing the calculation of metric values and parameter scores for projects, according to some embodiments.

FIG. 10 is a table comparing the EHI calculation for projects, according to some embodiments.

DETAILED DESCRIPTION

Figure 1A:
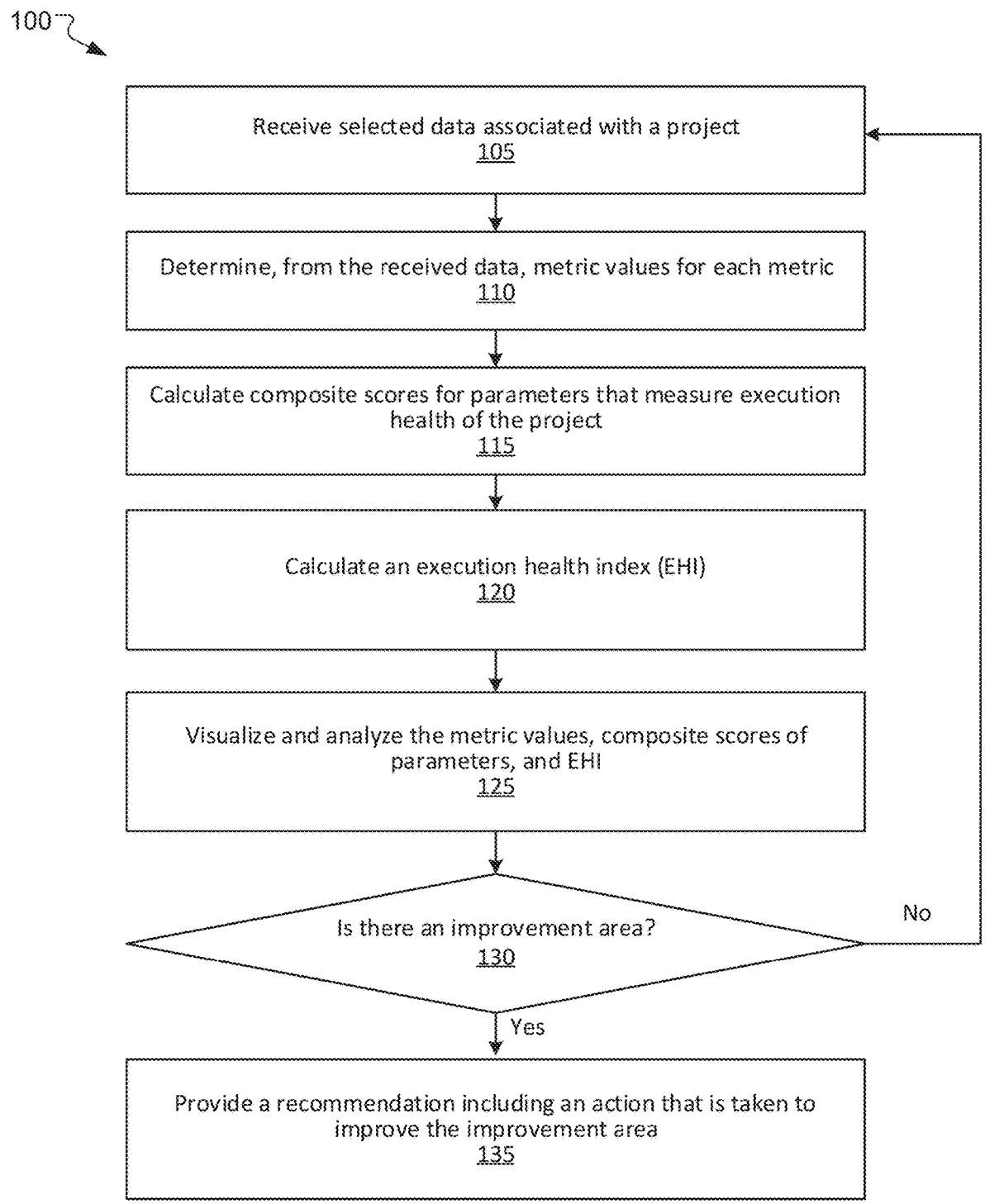
FIG. 1A is a flowchart of a method for automatically assessing project health and providing persona-based recommendations to improve the project health, according to some embodiments.

The Figures (Figs.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

The present disclosure relates to an end-to-end system that configures and tracks relevant metrics and provides a recommendation framework based on organization maturity. This system helps measure, analyze, visualize and predict project execution health in a timely manner based on individual parameters that are in turn calculated using various metrics.

Traditionally, projects are tracked by collecting data and maintaining risk registers. The data may be collected in terms of the schedule variance, effort variance, defect density, defect escape ratio, etc. Alternatively, project health may be measured on a "RAG" scale, where "Red" indicates projects at high risk, "Amber" indicates projects with risk under control, and "Green" indicates projects progressing with minimum risk. In addition, the existing monitoring and tracking methods are mainly built upon a single dimension such as requirement or quality. For example, project completion may be monitored and predicted based on sprint velocity following scrum methodology.

There are gaps to fill in monitoring and tracking projects by using the traditional or existing methods. Existing methods track projects based on metric analysis but do not support end-to-end systems (e.g., no actionable recommendation is provided to end users). Also, existing methods merely provide a piecemeal view of project health, for example, tracking projects on specific aspects such as quality, scope, schedule. While the existing methods may perform an analysis based on individual metrics to identify an issue, these methods are incapable of providing deep or detailed descriptions of the issue and thus cannot make any meaningful data-drive assumptions or recommendations to address the issue. Moreover, there are other dimensions of project delivery such as automation, Voice of Customer (VoC), productivity, agility which directly or indirectly affect project health; however, there is no existing framework that provides a combined view considering these parameters or dimensions. Also, the existing methods and systems lack transparency. In practice, organization leaders rarely have access to raw data. They are blind-sided and are forced to rely on other people to report the data, and thus may not help identify a real problem or provide a valuable recommendation/suggestion.

Sometimes projects are interpreted on a "RAG" scale. RAG oversimplifies the health representation and thus may cause risks to be overlooked. For example, in the so-called "watermelon status reporting," the RAG status of a project appears to be green from the outside. But an advanced analysis inside the project may reveal serious issue(s) and the RAG status should be red rather than green. Because the RAG model makes subjective interpretation, the resulting RAG status can disguise an actual status either to avoid any scrutiny check or to ensure the project continues.

To overcome the aforementioned drawbacks, the present disclosure proposes a technical solution that provides key performance indicators (KPIs) and metrics based on collected raw data using a descriptive or prescriptive analytics framework. The technical solution described herein is beneficial in various aspects. The present disclosure relates to an end-to-end system that covers the entire project management procedure, from the initial system configuration, through the calculation of metrics and analysis, visualization, and prediction of metrics and parameters, till the recommendation of project health. The monitoring and control process as described herein is a data-driven process based on metrics, which removes the ambiguity of existing methods and therefore is more measurable, concise and objective. The present disclosure also performs a persona-based analysis depending on different levels of scores such as individual metrics, parameters (e.g., weighted average of metrics), or a composite execution health index. The use of individual metrics enables monitoring and control much earlier in the lifecycle of a project. The present disclosure further utilizes multiple dimensions of project delivery such as schedule, scope, quality, VoC, automation, team culture, and agility. Additionally, the present disclosure allows the use of a standardized formula-based approach. The present disclosure collects raw data in a way that allows in-depth analysis and interpretation, and generates periodic trend graphs that help pattern prediction. A pattern may indicate deviations and highlight new risks or improvements. Moreover, the present disclosure recommends actions for timely course correction. The present disclosure is also able to apply various data ingestion techniques as needed per the frameworks for descriptive, prescriptive and predictive analytics. For example, the present disclosure leverages a predictive analytics framework, the granularity of weightage and other configurations to determine KPIs and metrics at different levels.

FIG. 1A is a flowchart of method 100 for automatically assessing project health and providing persona-based recommendations to improve the project health. A project is used to refer to different stages of a product lifecycle such as development and implementation. Typically, a project may have a short-term release cycle with a defined set of features to be delivered for the product or software, e.g., in a month or in a quarter. In some embodiments, the operations of method 100 are executed using exemplary system architecture shown in FIGS. 2-4, and are further detailed with reference to FIGS. 5-15 described below.

As depicted in FIG. 1A, method 100 starts with operation 105 where selected data associated with a project is received. The data may include different types of operational data or raw data that are selected for calculating selected metrics. Each metric may be selected and customized for the project based on organization requirements such as a project maturity level (described below in FIG. 6A). At operation 110, metric values for each metric are determined from the received selected data. At operation 115, composite scores for parameters that measure the execution health of the project are calculated. Since each parameter is measured based on multiple metrics, a composite score for a parameter is calculated. For example, the composite score for a parameter may be a weighted average of metric values of specific individual metrics. The operations 105, 110, and 115 essentially create a configuration process for selecting various parameters and corresponding metrics to be measured and analyzed. The configuration process will be described in more detail with reference to FIGS. 4-10.

At operation 120, method 100 continues with calculating an execution health index (EHI). The EHI is an overall project health interpretation based on high priority metrics selected for a particular project. In some embodiments, the EHI is a weighted composite of curated industry-standard metrics. The EHI may be on a scale-base for analysis. The metrics underneath the EHI may be adaptively expanded or reduced to augment product delivery cycles. The system described herein is designed to be sufficiently agnostic and extensible to leverage any needed operational data, use curated analytics frameworks such as descriptive, prescriptive, or predictive frameworks, and eventually arrive at the metrics required for the monitored project.

In some embodiments, the EHI as well as other composite scores associated with each parameter is a conglomeration of metrics and their weights based on a project type, a project domain, and other factors. The system in the present disclosure draws its precision based on various levers including the criticality of the project, the investment needed for monitoring, the cost of implementing the cluster of metrics to really arrive at the conglomeration. An EHI fits a specific project rather than fitting all projects. The EHI calculation will also be described in more detail with reference to FIGS. 4-10.

At operation 125, the metric values, composite scores of parameters, and EHI are visualized and analyzed. Each of the metric values, composite scores of parameters, and EHI represents a different level of score(s). The analysis of score(s) at different levels helps obtain a complete view of the project, and graphic visualization of different levels of score(s) facilitates reporting trends and predicting a future course of the project. In some embodiments, the analysis and visualization are persona-based, e.g., as shown in a bottom-up view or a top-down view. The analysis and visualization of different levels of score(s) will be described in more detail with reference to FIGS. 11A-13.

Next, at operation 130, based on the analysis of different levels of scores, it is determined whether there is an improvement area of the project. An improvement area may include a troublesome feature or a step needing further development. If the improvement area does not exist, method 100 returns back to operation 105 to continue receiving and processing the data associated with the project. However, if an improvement area is detected, method 100 continues with operation 135 where a recommendation is provided. The recommendation includes an action that is taken to improve the improvement area. In some embodiments, persona-based recommendations or actions corresponding to different levels of score(s) may be determined. For example, once an improvement area is identified, one or more EHI-based recommendations, parameter-based recommendations, and metric-based recommendations may be determined to make improvements at different levels of project management. The recommendations described herein are only deterministic based on the actual data of the project. The data may be documented based on defined scales and software development practices followed by the organization; however, no subjective assumptions/opinions are used for determining recommendations. The recommendation determination will be described in more detail with reference to FIGS. 14-15.

The present disclosure provides a technical solution for automatically assessing project health and providing persona-based recommendations to improve the project health. Advantageously, the present disclosure collects project health parameters/metrics in real time such that the health assessment is dynamic and up-to-date. Advantageously, the present disclosure uses comprehensive project health parameters/metrics that cover various aspects of project health such as quality, scope, schedule, automation, agility, voice of customer and risk, and thus increases the accuracy of project health assessment and recommendation. Advantageously, the present disclosure establishes an objective way to measure project health, and this data-driven objective measurements/assessment eliminates vulnerabilities of the subjective assumptions/opinions, which further increases the accuracy and efficiency of assessment and recommendation. Advantageously, the present disclosure automates the data collection, which not only speeds up the data processing procedure but also reduces the errors in data processing.

Advantageously, the present disclosure provides different views/visualization to different users based on different user roles such that each user can obtain the needed project health and risk information without drilling down layers of interfaces or views, and thus reduces complexity and increases operation efficiency. Advantageously, the present disclosure allows each user to drill down the layers to proactively provide important insights at appropriate places to help improve the project health. Advantageously, the present disclosure provides recommendations and actions to improve an improvement area, which prevents any computer and network resources otherwise waste on manual action inquiries. Advantageously, by providing hierarchical recommendations to continuously enhance the project at different levels, the present disclosure increases the productivity of the current project governance and management system and retains users in the current system.

When optimizing the project management, the present disclosure may identify an issue based on metrics/parameters associated with the project, and more specifically, drill down hierarchies of the data to identify a cause of the issue and an action used for solving the issue. The present disclosure described herein uses a specific technique, i.e., configuring and detecting data transmitted from various sources and through different network components (e.g., devices, modules in FIGS. 2-4), and integrating and analyzing the data to solve a technical problem arising in computer networks: identifying an issue (e.g., computer or network issues) and an action to solve the issue in project management environment. Therefore, the present disclosure focuses on the specific improvement in computer capabilities, that is, automatically detecting and acting upon network and/or computer issues in project management environment.

Figure 1B:
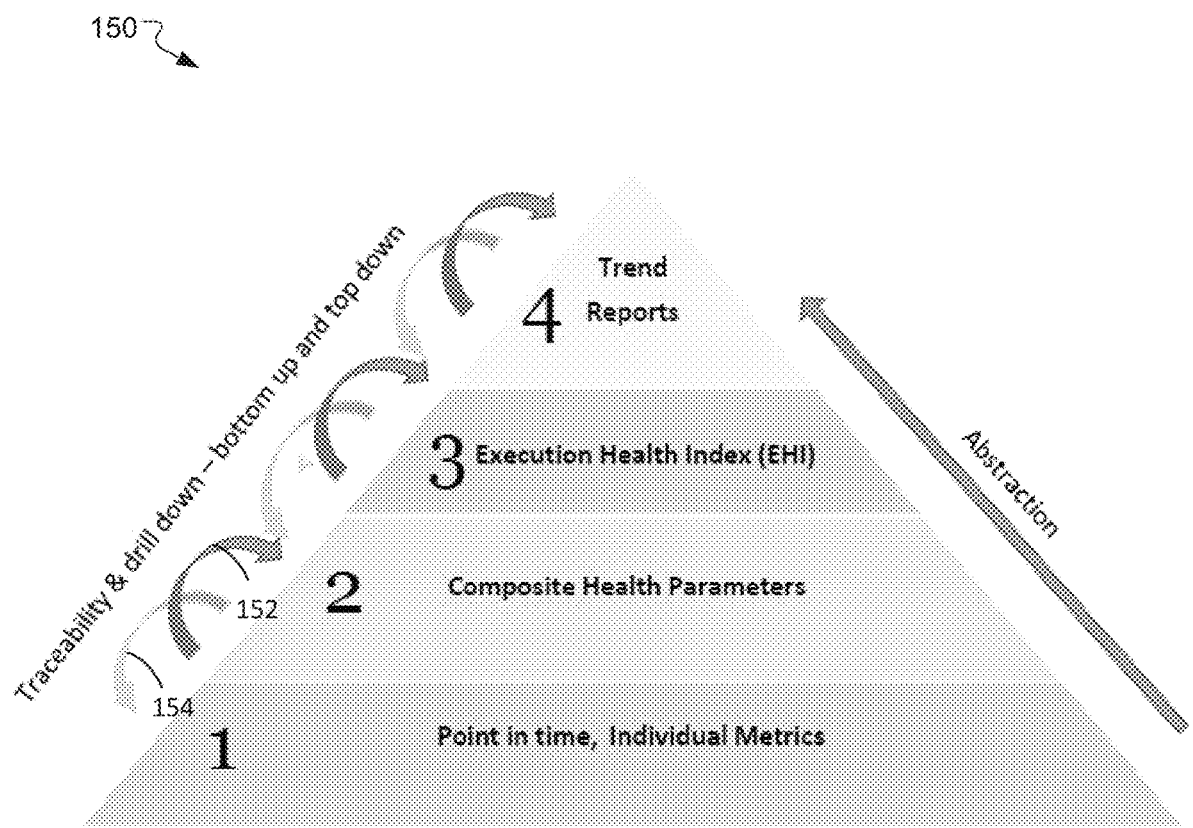
FIG. 1B is a model illustrating the working mechanism of a project management system, according to some embodiments.

FIG. 1B is a model 150 illustrating the working mechanism of a project management system described in the present disclosure. The end-to-end project management system may monitor and govern project health and predict risks based on the analysis of individual metrics and composite scores (e.g., EHI). As depicted, model 150 includes four layers. Model 150 allows bottom-up processing 152, where the incoming data of a project received in the first or base layer are processed to form the perception (e.g., reports) in the fourth or top layer. Model 150 also allows top-down processing 154, where an execution decision maker may identify the big picture of the project from the top and drill down to the components in the lower layer(s) for decision making.

In the first or base layer, individual metrics are identified and data related to the metrics are received. A metric may measure the execution health of a project such as a total defect count, defects by type and/or priority, story point closure via DevOps artifacts, etc. The metric may also include surveys for VOC and/or stakeholders, agile maturity, feedback of sprint demos, etc. Other types of metrics may be implementation life cycle (SILC) metrics including feature completion and/or acceptance ratio, performance and/or throughput metrics, flow efficiency, deployment success rate, or artificial intelligence development life cycle (AIDLC) metrics including F1 score, accuracy, etc. In some embodiments, point-in-time data associated with the metrics is received in the first layer. The point in time data may be utilized for control and immediate action, and periodically (e.g., daily or weekly) used by execution teams (e.g., engineers).

Once the metrics are identified and received, in the second layer of model 150, health parameters of the project such as quality, scope, automation, etc., are determined. The parameters may show comprehensive health and risk, and provide insight for strategic and tactical action. In some embodiments, a composite score for a parameter may be determined as a weighted average of values of metrics rolling into the parameter. Compared to the metrics, parameters are in a higher level of a data hierarchy. The composite scores of the parameters may be used by both execution teams and managers. In some embodiments, the composite scores may be computed at a defined frequency and used for periodic (e.g., weekly, monthly) or milestone management reviews.

Based on the composite scores of the health parameters, a consolidated health score, i.e., EHI, may be derived. Compared to the metrics presenting absolute health measurements of a particular project, the EHI evaluates the absolute health measurements upon targeted goals and/or other projects and provides a relative indication of the health and risk of the project. The EHI further signals the area(s) to drill down, e.g., an improvement area. In some embodiments, the EHI may be computed periodically (e.g., monthly) and at milestones, and used for high authority reviews (e.g., executive reviews).

The metrics, parameters and EHI each forms a level of a data hierarchy (e.g., a hierarchy of health and risk measurements). With these three levels of score(s), in the top or fourth layer of model 150, patterns and trends may be identified to generate trend reports. The trend reports may then be used for determining recommendations including corrective actions and predicting project courses.

Figure 2:
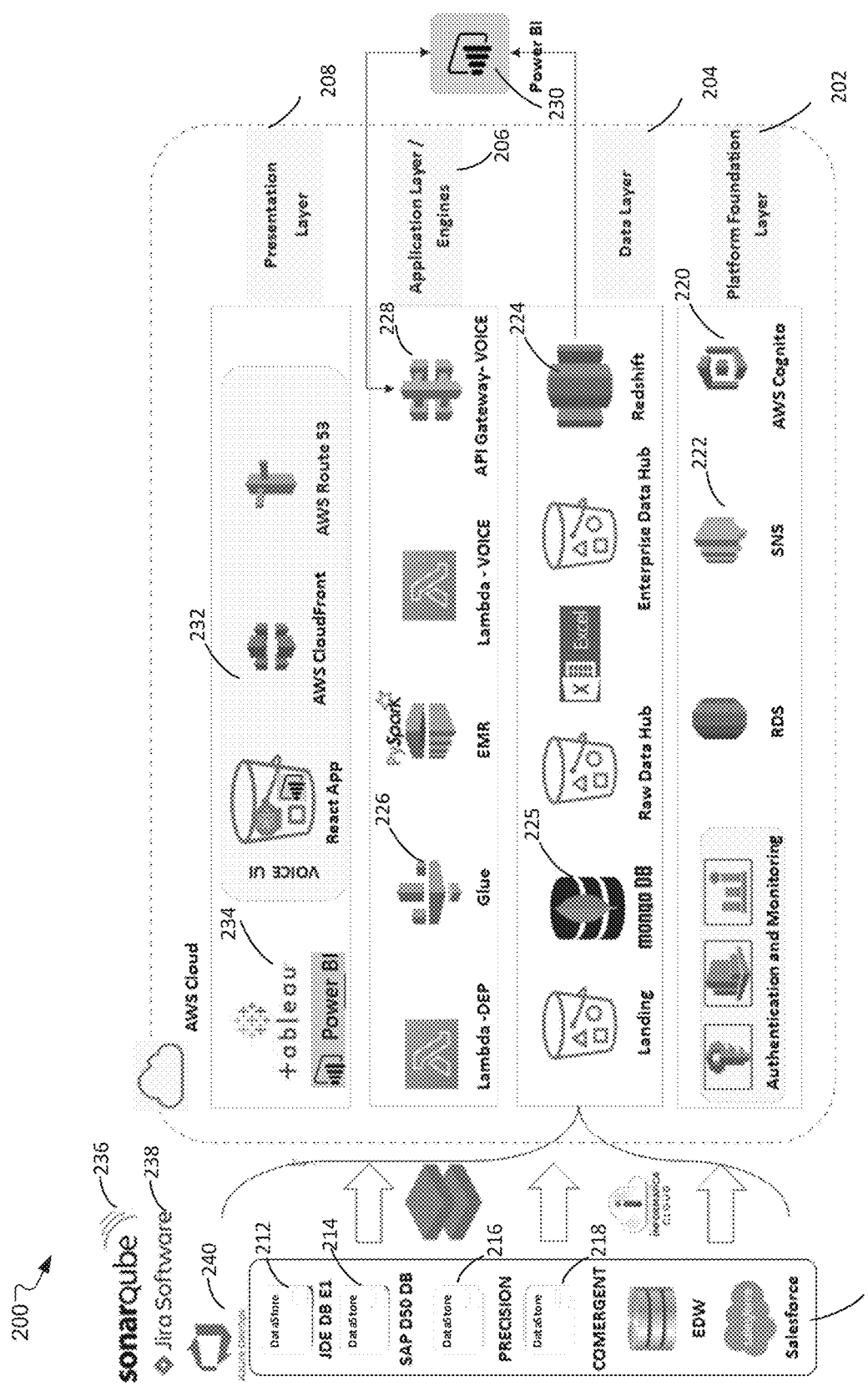
FIG. 2 is a network architecture deployed for monitoring, tracking, and analyzing project health measurements and recommending timely corrective actions using the methods described herein, according to some embodiments.

FIG. 2 is a network architecture 200 deployed for monitoring, tracking, and analyzing project health measurements and recommending timely corrective actions using the methods described herein, according to some embodiments. Network architecture 200 provides software, hardware, protocols, and media for implementing methods as described in the present disclosure. Network architecture 200 uses a layer model to characterize the message/signal transmissions between layers and the implementation of project management functions by each layer. In some embodiments, architecture 200 includes a platform foundation layer 202, a data layer 204, an application layer/engines 206, and a presentation layer 208. In some embodiments, architecture 200 is based on Amazon™ web service (AWS) cloud.

In platform foundation layer 202, authentication and monitoring functions are performed. For example, platform foundation layer 202 may include AWS Cognito 220 to provide authentication, authorization, and user management for different levels of users. Platform foundation layer 202 may also include simple notification service (SNS) 222 to provide message delivery from the system to users. Platform foundation layer 202 may send to and receive data from other layers such as data layer 204. Data layer 204 collects data from multiple sources and organizes the data for distribution and sharing through data hubs and warehouse such as Amazon Redshift 224, a NoSQL, database program like MongoDB 225, etc. In some embodiments, data layer 204 may also be coupled to other datastores to exchange and process rich data from various sources. For example, data layer 204 may connect to datastores 210 including JDE enterprise DB 212, SAP DSO DB 214, PRECISION 216, COMERGENT 218, data warehouse (EDW), etc.

Application layer/engine 206 is on top of data layer 204, which provides tools to receive, integrate, and process data. For example, an AWS Glue 226 in application layer/engine 206 can discover, prepare, and combine data for analytics such as descriptive, prescriptive, or predictive analytics frameworks. Further, an API Gateway Voice 228 may be used to receive metric values, composite scores for parameters and EHI. The received scores are transmitted from API Gateway Voice 228 to power BI 230. Power BI 230 is an intelligent data visualization tool for converting the received data into interactive dashboards and analysis reports in a simple interface. Once the data is converted, Power BI 230 may transmit the data to a datastore such as Redshift 224 for storage. Other components of network architecture 200 may retrieve the metrics, parameters, and calculated scores/values stored on the datastore for further processing. Above application layer/engine 206 is presentation layer 208. Presentation layer 208 is responsible for interfacing with users. For example, using the web service of AWS CloudFront 232 and the interactive data visualization software Tableau 234, at least one of a top-down view or a bottom-up view may be presented to a user based on the user role of the user.

Additionally, in communication with different layers of software to implement the specific functionalities described in the present disclosure, an open-source platform SonarQube 236 is used for continuous inspection and perform automatic reviews of code quality, Jira Software 238 is built to plan, track, and release great software, and Azure DevOps 240 is used to provide developer services for the teams to plan work, collaborate on code development, and build and deploy applications.

Figure 3:
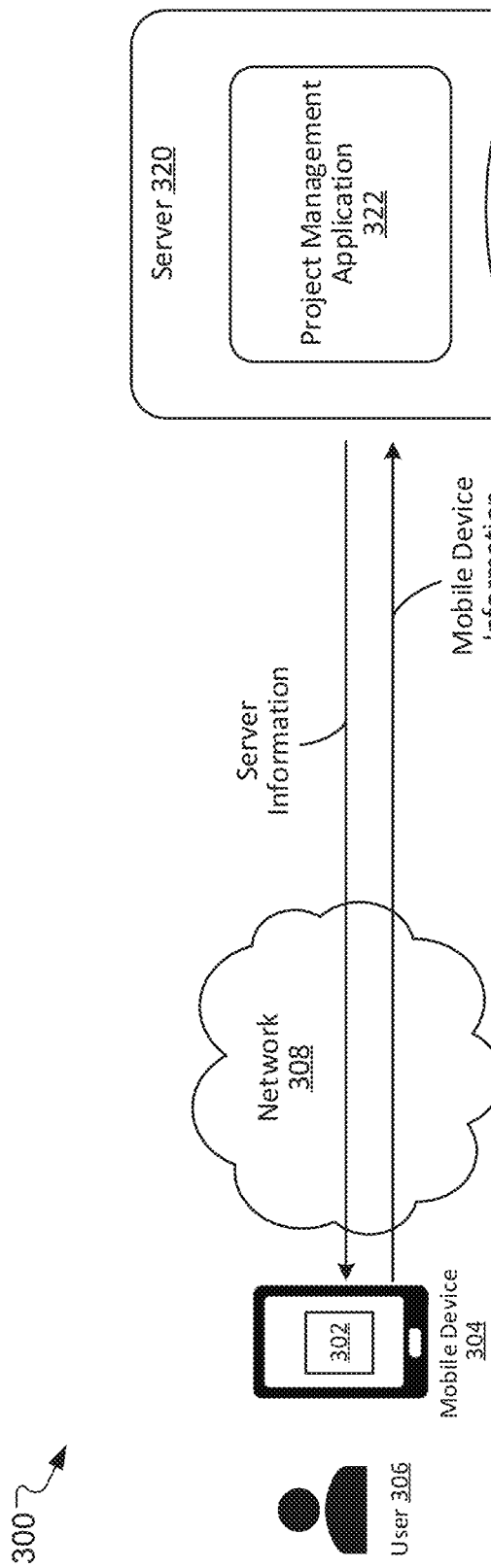
FIG. 3 is a system for automatically assessing project health and providing persona-based recommendations to improve the project health, according to some embodiments.

FIG. 3 is a system 300 for automatically assessing project health and providing persona-based recommendations to improve the project health, according to some embodiments. By way of example and not limitation, the methods described herein (e.g., method 100 in FIG. 1A) may be executed, at least in part, by a software application 302 running on mobile device 304 operated by a user 306. By way of example and not limitation, mobile device 304 can be a smart phone device, a tablet, a tablet personal computer (PC), or a laptop PC. In some embodiments, mobile device 304 can be any suitable electronic device connected to a network 308 via a wired or wireless connection and capable of running software applications like software application 302. In some embodiments, mobile device 304 can be a desktop PC running software application 302. In some embodiments, software application 302 can be installed on mobile device 304 or be a web-based application running on mobile device 304. By way of example and not limitation, user 306 can be a member of an execution team who performs routine management of a project, a manager of the execution team who manages and review the project, a high authority figure who reviews and makes decisions about the project, or other users who are working remotely and have access to software application 302 via mobile device 304.

Network 308 can be an intranet network, an extranet network, a public network, or combinations thereof used by software application 302 to exchange information with one or more remote or local servers, such as server 320. According to some embodiments, software application 302 can be configured to exchange information, via network 308, with additional servers that belong to system 300 or other systems similar to system 300 not shown in FIG. 3 for simplicity.

In some embodiments, server 320 is configured to store, process and analyze the information received from user 306, via software application 302, and subsequently transmit in real time processed data back to software application 302. Server 320 can include a project management application 322 and a data store 324, which each includes a number of modules and components discussed below with reference to FIG. 4. According to some embodiments, server 320 performs at least some of the operations discussed in the methods described herein (e.g., method 100 in FIG. 1A). In some embodiments, server 320 can be a cloud-based server.

Figure 4:
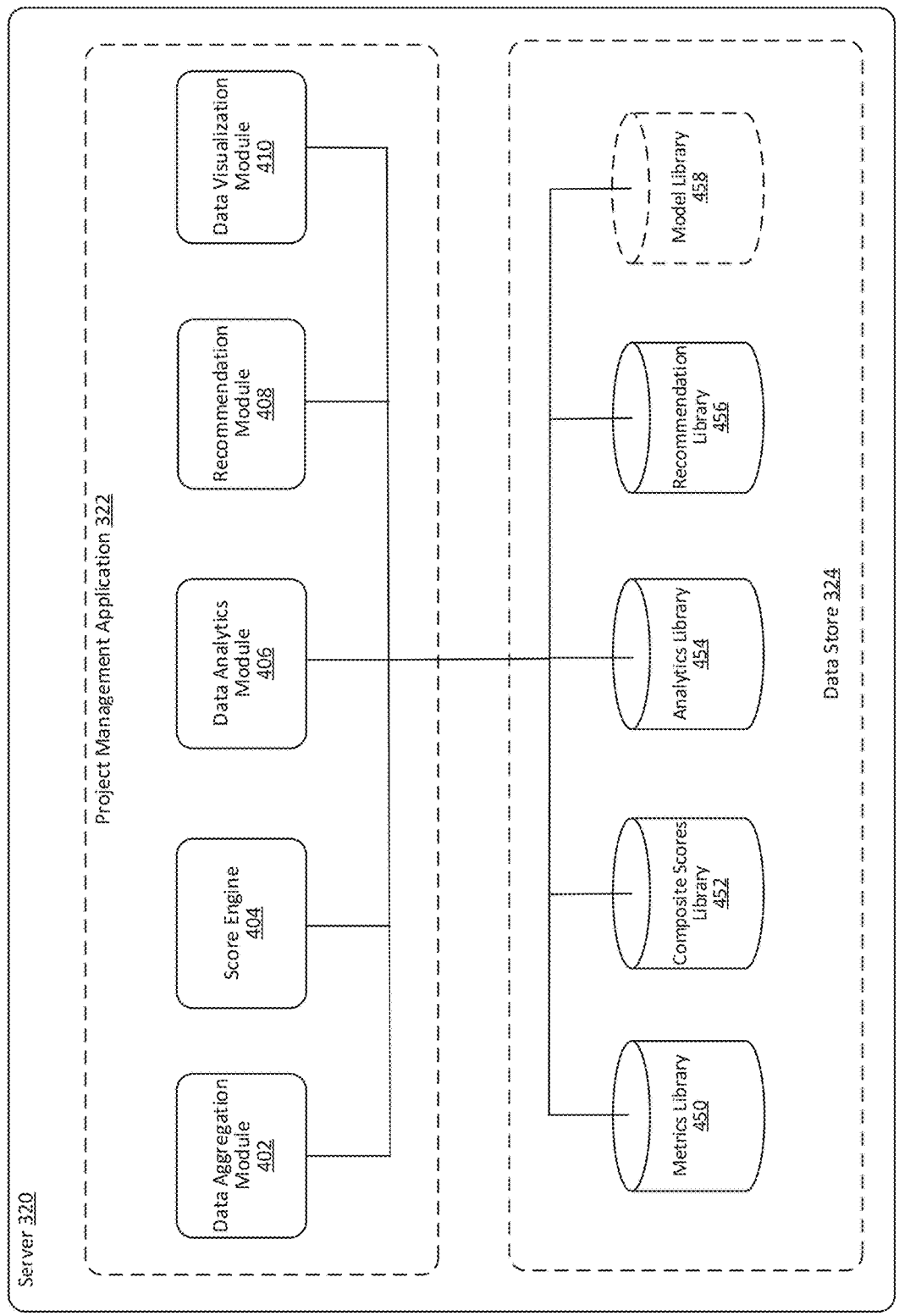
FIG. 4 is a server used as part of a system for evaluating and recommending the project health using the methods described herein, according to some embodiments.

In some embodiments, FIG. 4 depicts selective components of server 320 used to perform the functionalities described herein, for example, operations of method 100. Server 320 may include additional components not shown in FIG. 4. These additional components are omitted merely for simplicity. These additional components may include, but are not limited to, computer processing units (CPUs), graphical processing units (GPUs), memory banks, graphic adaptors, external ports and connections, peripherals, power supplies, etc., required for the operation of server 320. The aforementioned additional components, and other components, required for the operation of server 320 are within the spirit and the scope of this disclosure.

In the illustrated embodiment of FIG. 4, server 320 includes a project management application 322 and a data store 324. Project management application 322 in turn includes one or more modules/engines responsible for processing and analyzing the information received by server 320. For example, the modules in project management application 322 may detect and analyze metric data of a project received from various sources, and present analytic view(s) and recommendation(s) to user 306 via software application 302 residing on mobile device 304.

In some embodiments, project management application 322 of server 320 includes a data aggregation module 402, a score engine 404, a data analytics module 406, a recommendation module 408, and a data visualization module 410. In some embodiments, project management application 322 of server 320 may include only a subset of the aforementioned components (e.g., modules, engines) or include at least one of the aforementioned components. Additional components may be present on other servers communicatively coupled to server 320. For example, project management application 322 of server 320 may only include data aggregation module 402 and score engine 404, while data analytics module 406, recommendation module 408, and data visualization module 410 reside on another server communicatively coupled to server 320. All possible permutations and combinations, including the ones described above, are within the spirit and the scope of this disclosure. In some embodiments, project management application 322 is implemented by at least some components shown in FIG. 2, such as AMS Glue 226, API Gateway Voice 228, Power BI 230.

In some embodiments, data store 324 includes a metrics library 450, a composite scores library 452, an analytics library 454, a recommendation library 456, and an optional model library 458. Each library stores one or more types of data used in implementing the methods described herein. By way of example and not limitation, each library can be a hard disk drive (HDD), a solid-state drive (SSD), a memory bank, or another suitable storage medium to which other components of server 320 have read and write access. In some embodiments, data store 324 may be one or more of data stores shown in FIG. 2.

Figure 5:
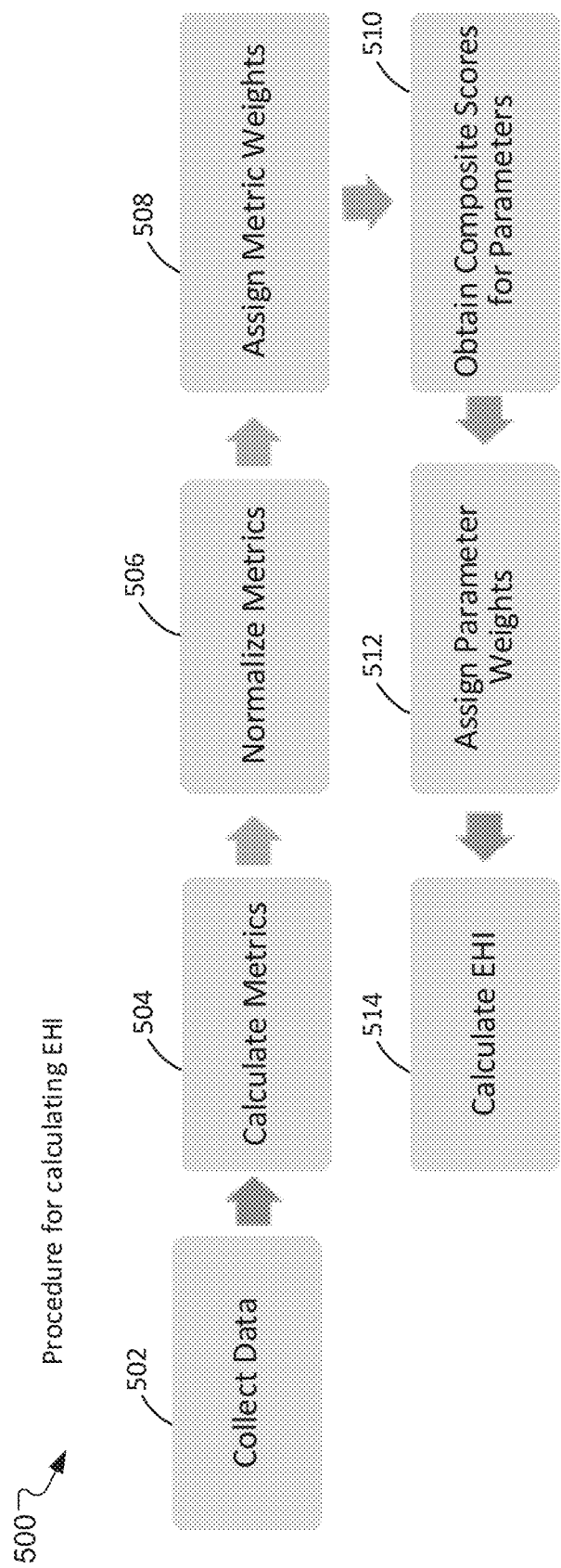
FIG. 5 is a flowchart of a method for calculating an execution health index (EHI), according to some embodiments.

In some embodiments, data aggregation module 402 and score engine 404 are mainly responsible for ingesting raw data of a project to obtain metrics and converting the metrics into composite scores. As depicted in FIG. 5, to obtain composite scores such as an EHI, data aggregation module 402 and score engine 404 may perform method 500 including collecting data of a project at operation 502, calculating values of metrics at operation 504, normalizing the values of metrics at operation 506, assigning metric weights for each metric at operation 508, obtaining composite scores for parameters at operation 510, assigning parameter weights for each parameter at operation 512, and calculating the EHI at operation 514. Each of the operations 502-514 will be described in detail in FIGS. 6A-6C.

Data aggregation module 402 may identify parameters and metrics of a project to be measured and analyzed, and collect corresponding data from various sources. In some embodiments, data aggregation module 402 along with score engine 404 may perform a configuration process to define a measurement/metrics framework, that is, customizing the definitions, formulas, limits, weights, etc., associated with metrics and/or parameters based on certain criteria (e.g., a project maturity level in an organization).

Figure 6A:
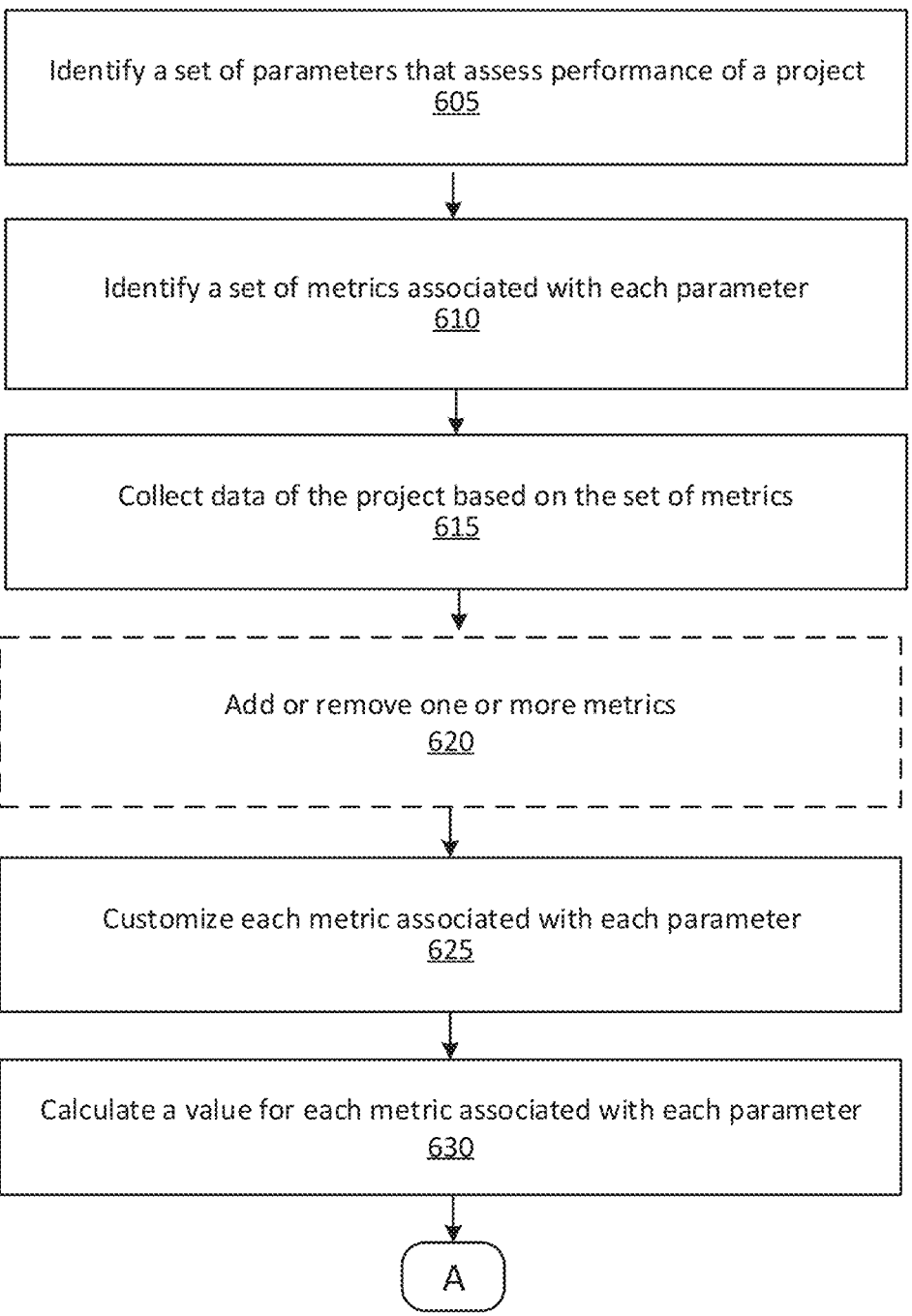
FIGS. 6A-6C illustrate a flowchart of a method for configuring and receiving metrics and calculating different levels of scores based on the metrics, according to some embodiments.
Figure 6B:
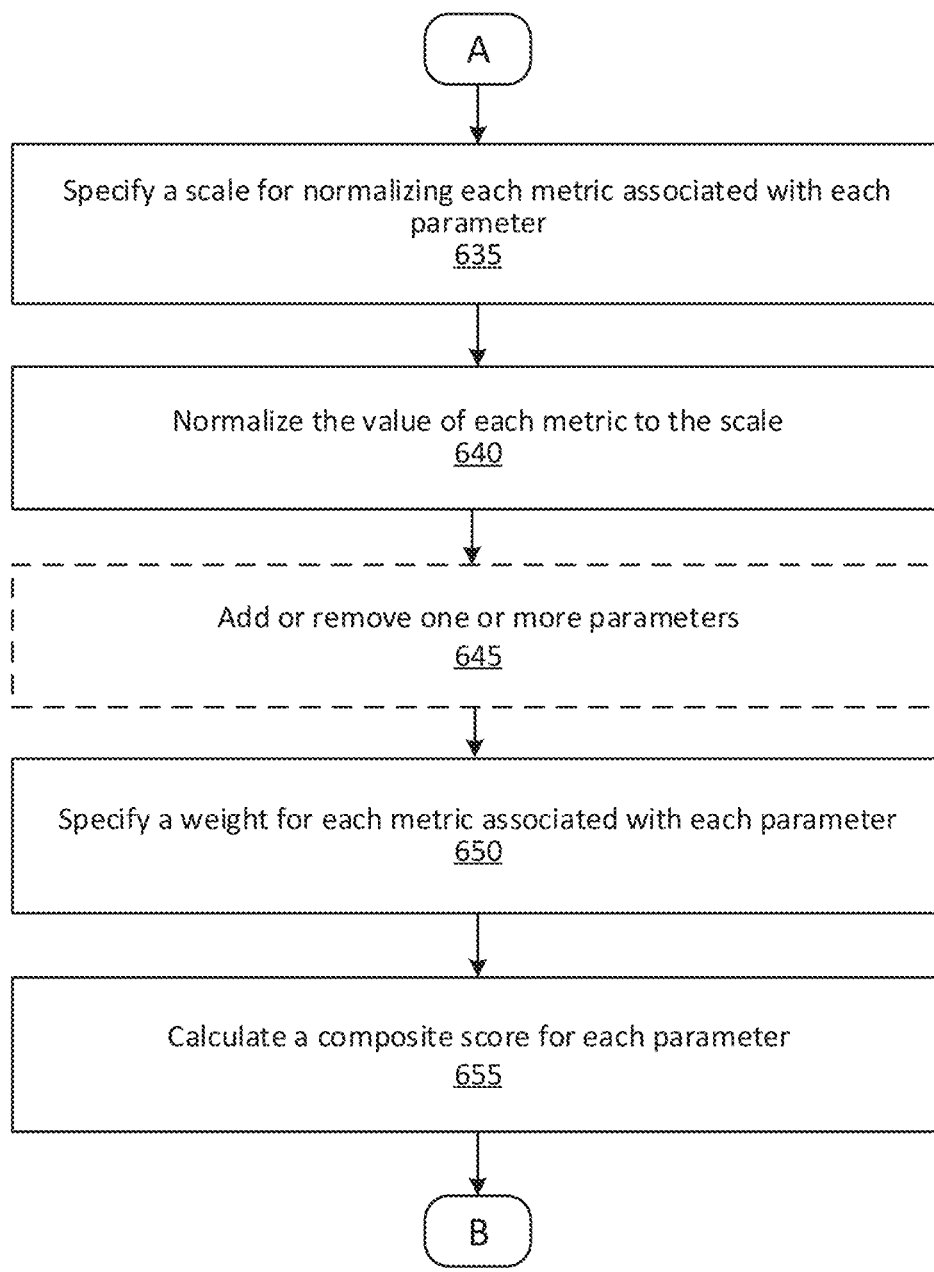
Figure 6C:
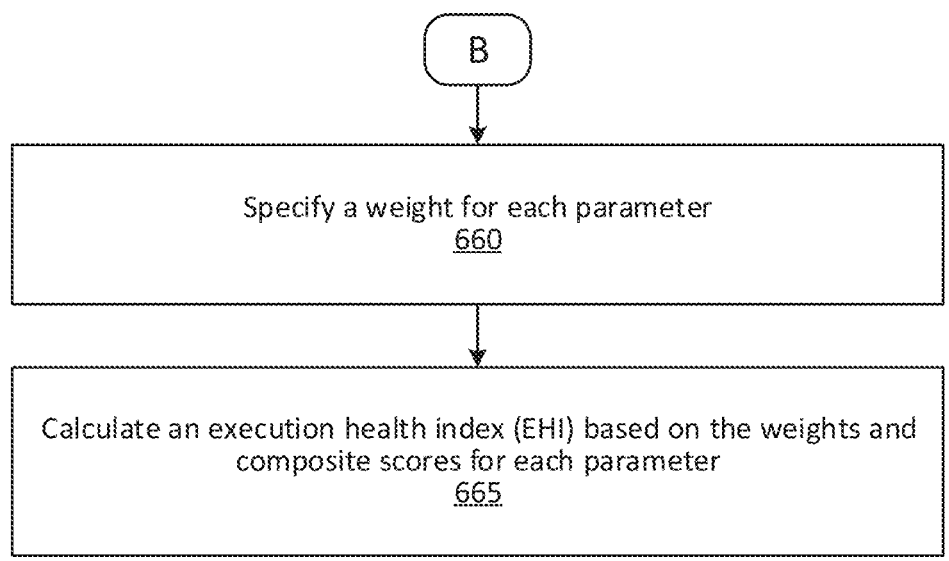
Figure 7:
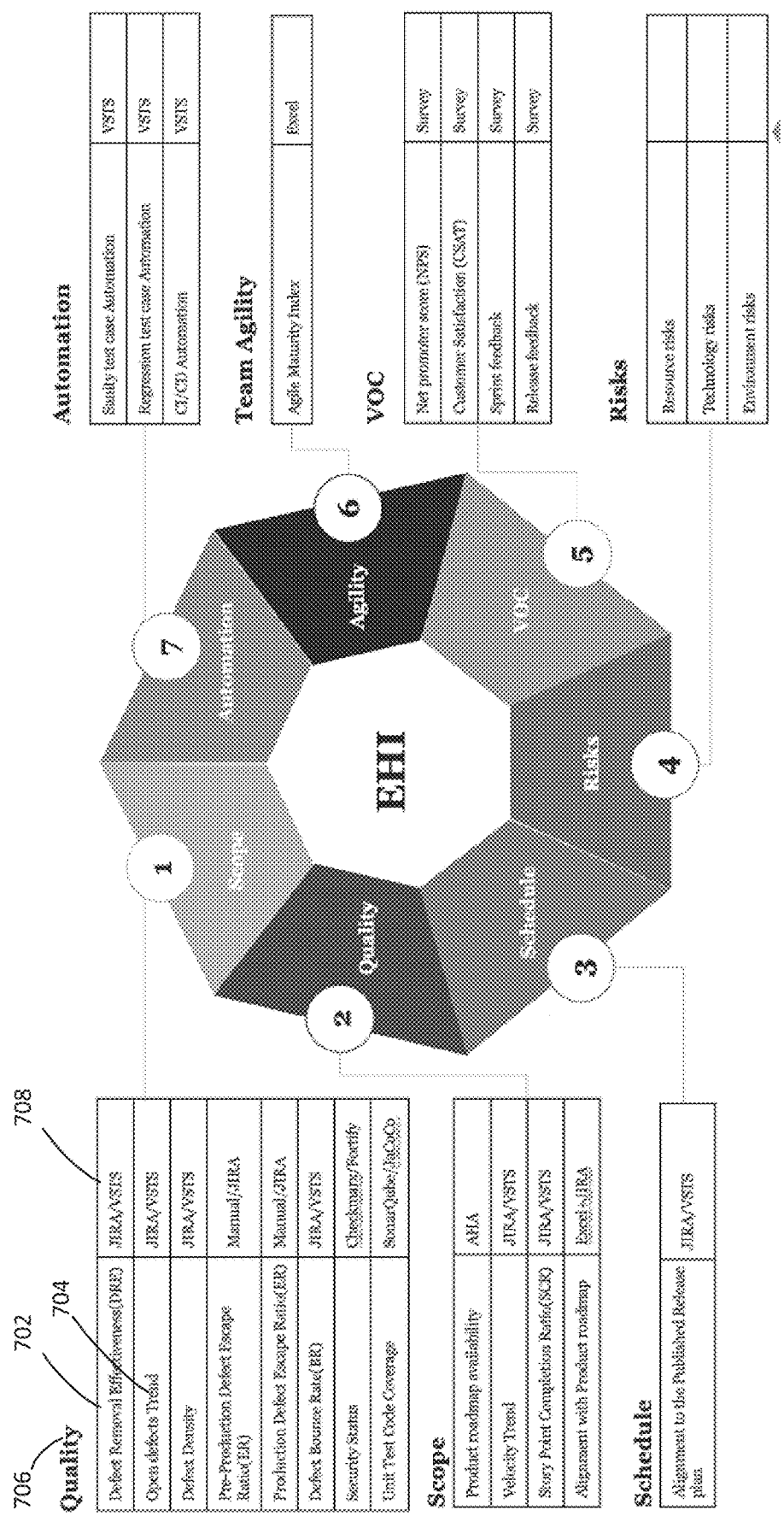
FIG. 7 shows example parameters and corresponding metrics, according to some embodiments.

FIGS. 6A-6C illustrate a flowchart of a method 600 for configuring and receiving metrics and calculating different levels of scores based on the metrics. At operation 605 of FIG. 6A, data aggregation module 402 may identify a set of parameters that assess the performance or health of a project. The parameters may be scope, quality, schedule, risks, VOC, agility, automation as shown in FIG. 7. Although FIG. 7 lists only seven parameters, it should be understood many other parameters may be used. In some embodiments, data aggregation module 402 may prioritize a plurality of parameters based on a project type, a project maturity level in an organization, or other project requirements, and select, from the plurality of parameters, a set of parameters of high priorities for further processing. A project maturity level represents a level of the progressive development of a project in an organization. The project maturity level varies for each organization based on specific goals, strategies, resource capabilities, scope, and needs of the organization. In some embodiments, data aggregation module 402 may monitor, track, and analyze primary parameters and secondary parameters. The primary parameters may be primary factors that determine the execution health of the project such as scope, quality and schedule shown in FIG. 7. The secondary parameters may be important factors that indirectly influence the execution health of the project such as automation, agility, VOC, and risks shown in FIG. 7.

After the parameters are selected, at operation 610, data aggregation module 402 may identify a set of metrics associated with each parameter. For example, in FIG. 7, defect removal effectiveness (DRE) 702, open defects trend 704, and other six metrics contribute to measuring the quality of the project, and thus these eight metrics are associated with or correspond to quality parameter 706. It should be understood that each parameter such as quality parameter 706 may be associated with many metrics (e.g., more than the eight metrics). In some embodiments, data aggregation module 402 selects the set of metrics at least based on the project maturity level. For example, if a project is at an initial stage, any metrics measuring the project completion may be inapplicable.

Once the parameters and corresponding metrics are determined, at operation 615, data aggregation module 402 may collect operational data or raw data corresponding to the identified metrics and parameters. In some embodiments, data aggregation module 402 may collect the data from various sources through a management tool such as JIRA or Visual Studio Team System (VSTS) 708 as shown in FIG. 7. Other management tools include, but are not limited to, Azure devOps, Sonar cube, Jacoco or even Microsoft Excel. The data collection is usually automatic, but it can be manually performed when certain metric data is needed.

In some embodiments, data aggregation module 402 also determines the timing and frequency to collect the data. For example, the VOC is an important parameter that provides an indication of product business value and quality. When converting the feedback of VOC into usable metrics and measurable actions, it is important for data aggregation module 402 to set up appropriate timing and frequency to collect the feedback such that the bias and negative impact (e.g., when life events are involved) may be avoided. Data aggregation module 402 may further be configured to collect the data from appropriate sources. The feedback of VOC can be direct or indirect. When the feedback is received directly from clients or customers through surveys, data aggregation module 402 may be configured to obtain survey data for corresponding metrics such as Net Promoter Scores (NPS), Lifecycle Customer Satisfaction Transactional (CSAT) scores, community posts, etc. When the feedback is generated responsive to the interactions of clients with a product, data aggregation module 402 may be configured to collect usage data, support data, and other behavioral data for obtaining corresponding metrics.

At operation 620, data aggregation module 402 may add or remove one or more metrics. This is optional because the metrics may change under the condition that product requirement and/or status (e.g., the project maturity level) varies. For example, one or more of the secondary parameters may be extended to include Software Implementation Life Cycle (SILC) metrics such as feature completion/acceptance ratio, performance/throughput metrics, flow efficiency, deployment success rate, or to include Artificial Intelligence Development Life Cycle (AIDLC) metrics such as F1 score, accuracy that is specific to AI and matching learning domain. In some embodiments, a parameter may change (e.g., based on dynamic project requirement changes) to cause the metrics corresponding to the parameter to change.

Data aggregation module 402 identifies the number and types of metrics to customize the metrics to be monitored and tracked for a project in an organization. These metrics may be expanded or reduced based on a dynamic change of the project requirements. At operation 625, data aggregation module 402 may also customize the metrics that have been identified. In some embodiments, data aggregation module 402 may change the definition, measuring criteria or formula for a metric based on requirements for a particular project. For example, data aggregation module 402 may adjust a measuring interval in a formula to change the calculation of a metric. Data aggregation module 402 then communicates with score engine 404 to calculate a value for each metric associated with each parameter at operation 630.

Score engine 404 is responsible for calculating values for metrics based on the customized formulas as well as calculating composite scores (as described below). FIG. 8 is a table 800 illustrating the calculation of metric values and a composite score for a corresponding parameter for a project. Data aggregation module 402 customizes the definitions and measuring criteria related to one or more of values A through E at 802 to determine a final formula 804. Based on the final formula 804 and measurements 806, score engine 404 calculates a value of 32.2% at 808 for metric DRE 702. In some embodiments, scoring engine 404 in combination with data aggregation module 402 stores data relevant to metrics in metrics library 450. The relevant data include, but are not limited to, metric attributes (e.g., number, type, name), measuring intervals, customized formulas, values of metrics, etc.

Referring now to FIG. 6B, a composite score for a parameter is determined. Responsive to values of each metric associated with the parameter being calculated, data aggregation module 402 may specify a scale for normalizing metrics at operation 635, and normalize the value of each metric to the scale at operation 640. Instead of scaling an overall health indicator as in a RAG system to over-standardize and create false positives/negatives, data aggregation module 402 defines scales to underneath data such as metrics. In the examples of the present disclosure, data aggregation module 402 defines a scale of 1-3 based on a lower control limit (LCL) and an upper control limit (UCL) for each metric, although scale variations (e.g., 1-5) may be possible. Using a three point scale or scale of 1-3, if a raw value of a metric computed based on a formula is not greater than the LCL, the normalized value is 1. If the raw value is between the LCL and the UCL, the normalized value is 2. If the raw value is not lower than the UCL, the normalized value is 3. FIG. 8 shows a scale of 1-3 at 810. The raw value of 32.2% at 808 is normalized to a value of 1 at 812 (e.g., when LCL is 70%). In some embodiments, data aggregation module 402 either uses industry-standard scales or analyzes different projects in an organization to determine the LCL and UCL. These limits may also be a blend of organization and industry benchmarks. Data aggregation module 402 may also dynamically adjust one or more of the LCL and UCL based on a change of maturity level of the project in the organization. If the project maturity level or other project requirement is changed, optionally, at operation 645 of FIG. 6B, one or more parameters may be added or removed. Adding/removing parameters and metrics during the runtime of the project management system increases the system flexibility as well as the accuracy of health and risk prediction.

Next, score engine 404 combined with data aggregation module 402 specifies a weight for each metric associated with each parameter at operation 650 and calculates a composite score for each parameter at operation 655. In some embodiments, the composite score for a parameter is a weighted average of the metric values contributing to the parameter. For example, a weight 814 is respectively assigned to each of eight metrics of FIG. 8, and, based on the weights and normalized values of each metric (e.g., in 812), a composite score 816 of an overall quality indicator (i.e., quality parameter) is calculated to be 1.3. Here, the higher the score, the higher the degree of confidence in each parameter, and vice versa.

FIG. 9 is a table 900 comparing the calculation of metric values and parameter scores for two projects 902 and 904. As depicted, metric values or scores 906 and 908 are respectively determined for each metric of projects 902 and 904. Each metric corresponds to one of the parameters including quality, scope, automation, schedule, and team agility. Scores 906 and 908 are normalized to scores in 910 and 912 respectively based on the LCLs 914 and UCLs 916, which are then combined with weights 918 to generate the composite scores for each parameter such as scores 920 and 922 for an overall quality indicator. In some embodiments, data relevant to calculating composite scores for parameters are stored in composite scores library 452.

Example parameters and corresponding metrics that may be used in the present disclosure are listed in the following tables 1-7. The example parameters include quality, scope, schedule, automation, team agility, VOC, and risk. The listed metric attributes include definitions of the metrics, formulas used to calculate the metrics, and three-point scales used to obtain the normalized values of metrics, and queries used to obtain the metrics from management tools such as JIRA.

TABLE 1

Quality Parameter

| Metrics | Definition | Formula | Score | Queries |
|---|---|---|---|---|
| Defect Removal Effectiveness (DRE) | This metric shows the burndown of defects on a periodic (e.g., monthly) basis and/or at the release level. | (Total number of defects closed during the month/ New defects raised in that month) × 100% | Score 1: <70% Score 2: 70% < X < 90% Score 3: >90% | Jira Queries Closed defects during the month (A) project in ("XYZ'", "LMN") AND issuetype in(Bug) AND (status changed To Closed DURING ("2020/02/01", "2020/02/29")) New defects created in the month (B) project in ("χYZ", "LMN") AND issuetype in (Bug) and ((createdDate >= "2020/02/01")and (createdDate<= "2020/02/29")) |
| Open defects Trend | This metric provides the health of defect backlog. This is to be measured at the end of release. It also provides an indication of the accumulation of defectsover the release cycles. | | Score 1: If (count > 0 for critical/blockers(A)) AND (count > 0 for Major/Minor with age > 90 man-days(B)) Score 2: If (count = 0 for critical/blockers(A)) AND (count > 0 for Major/Minor with age > 90 man-days(B)) Score 3: If (count = 0 for critical/blockers(A)) AND (count = 0 for Major/Minor with age > 90 man- days(B)) | Blocker Defects project in ("XYZ", "LMN") AND issuetype in(Bug) and priority in (Blocker) and ((statuswas not in (Closed) on ("2020/02/29"))) |
| Defect Density | Value A: Weighted Defects Value B: Story points spent in last one month. i.e, Two closed sprints (considering sprint size in two weeks) Formula: A/B | In order to calculate defect density, find defects based on severity from the tool which got opened for that month. Give weights to defects based on severity Blocker 1 Critical 0.75 Major 0.3 Minor 0.1 | Score 1: <70% Score 2: 70% < X < 90% Score 3: >90% | project in ("XYZ", "LMN") AND issuetype in (Bug) and priority in (Blocker) and ((createdDate >= "2020/02/01") and (createdDate<= "2020/02/29")) |
| Pre- Production Defect Escape Ratio (ER) | This metric indicates the ratio of production defects found to QA defects during product testing for n-1 release. This is typically measured after the release. | | Score 1: >=5% Score 2: >3% & <5% Score 3: <3% | |

TABLE 1-continued

Quality Parameter

| Metrics | Definition | Formula | Score | Queries |
|---|---|---|---|---|
| Pre-Production Defect Escape Ratio (ER) | This metric indicates the ratio of production defects found to QA defects during product testing for n-1 release. This is typically measured after the release. External Escape Ratio: Number of defects found in production vs Number of defects found during product testing Internal Escape Ratio: Number of defects found after product testing before deploying it on production (e.g., UAT/Implementation) vs Number of defects found during product testing. | Formula: (Number of defects in production/Total number of defect)*100% *Note: Label should be added for customer, system testing andcompliance testing. Affect Version MUST be updated to get all the issue raised in one release | Score 1: >=5% Score 2: >3% & <5% Score 3: <3% | |
| Defect Bounce Rate (BR) | Number of Bugs Re-Opened vs Number of Bugs Closed Formula: (Number of bugs re-opened*100)/Total number of bugs closed) = (Value C*100)/ (Value C + Value D) | Reopened Defects/Closed Defects without Reopened | Score 1: >=5% Score 2: >3% & <5% Score 3: <3% | Reopened Defects project in ("XYZ", "LMN") AND issuetype = Bugand status changed from ("Ready for Test") to ("Reopened") during ("2020/02/01", "2020/02/29") Closed Defects without Reopened project in ("XYZ", "LMN") AND issuetype = Bugand (status changed from ("Ready for Test") to ("Closed") during ("2020/02/01", "2020/02/29")) AND (status was not in (Reopened)) |
| Security Status | 1) Static application security testing (SAST-Tool Checkmarx/Fortify) 2) Infosec (DAST) | | Score 1: Blocker/Critical(A) != 0 Score 2: Blocker/Critical(A) = 0 and Major(B) != 0 Score 3: Blocker/Critical(A) = 0 and Major(B) = 0 | Blocker Defects labels in (XYZInfosec) AND fixVersion in (Q1)AND priority = Blocker AND status = "To Do"and (status was not in (done) on ("2020/02/29")) |
| Unit Test Code Coverage | | Calculated value from software like jacoco, sonarcube | Score 1: <70% Score 2: 70% < X < 85% Score 3: >85% | |

TABLE 2

Scope Parameter

| Metrics | Definition | Formula | Score | Queries |
|---|---|---|---|---|
| Product roadmap availability | This is the timely availability of the product roadmap in any of the Requirement Management Tool e.g. AHA. This parameter indicates the release readiness aspect as well as the product maturity and the vision. | | If the score falls under the L1 bucket, it could mean the following- 1. Delay in the release kick off 2. No plans to further invest in the product 3. Product may already be in the maintenance mode | |

TABLE 2-continued

Scope Parameter

| Metrics | Definition | Formula | Score | Queries |
|---|---|---|---|---|
| Story Completion Ratio (SCR) | This metric provides a ratio of the number of stories points completed in a sprint versus the number of stories that were committed. This indicates the planned vs actual scope delivered. Take latest sprint | Formula: Story Completion Ratio = (No. of Story points Closed)/(No. of Story points committed) | | |
| Velocity | This metric provides the Release Velocity. This is arrived at by considering the latest 5 sprint average velocity (Story points)(A) that will then be compared to previous 5 sprint average velocity (B). Velocity over releases tells if a sustainable pace has been established to deliver a value | Formula: (Latest 5 sprint average velocity/last 5 sprint average velocity(B)) | | |
| Alignment withproduct road map | What is a level of deviation from the signed off roadmap? What is the impact to the overall product vision due to this variance? What are the reasons for deviating? | | | |
| Over Utilizationof Capacity for Technical debt | This metric provides information on how much over and beyond of the agreed upon team's capacity is channelized towards addressing Tech Debt vs Product Enhancements. It may also be one of the key reasons to deviate from the product roadmap (unless tech Debt is the conscious target) | Formula: Actual Story points burnt-Planned Story points | | |
| Over Utilization of Capacity for Customer requests/ defects | This metric provides information on how much over and beyond of the agreed upon team's capacity is channelized towards addressing support issues and other maintenance work. It may also be one of the key reasons to deviate from the product roadmap | Formula: Actual Story points burnt-Planned Story points (for Customer defects/CRs/ Support etc) | | |

TABLE 3

Schedule Parameter

| Metrics | Definition | Formula | Score | Queries |
|---|---|---|---|---|
| Alignment to the Published Release plan | | | | |

TABLE 4

Automation Parameter

| Metrics | Definition | Formula | Score | Queries |
|---|---|---|---|---|
| Sanity testcase Automation | | | Score 1: <90% Score 2: 90% < X < 100% Score 3: =100% | |
| Regression test case Automation | | | Score 1: <60% Score 2: 60% < X < 80% Score 3: >80% | |

TABLE 4-continued

Automation Parameter

| Metrics | Definition | Formula | Score | Queries |
|---|---|---|---|---|
| CI/CD Automation | | | Score 1: Only CI Score 2: CI/CD Score 3: CI/CD/CT/ Security/Branching Best Practices | |

TABLE 5

Team Agility Parameter

| Metrics | Definition | Formula | Score | Queries |
|---|---|---|---|---|
| Agile Maturity Index | Determines the Agile maturity of theteam | Captured through questionnaire related to different aspects of Agile | | |

TABLE 6

Voice of Customer Parameter

| Metrics | Definition | Formula | Score | Queries |
|---|---|---|---|---|
| NPS Score | Net Promoter Score (NPS) is a metric used in customer experience programs. NPS measures the loyalty of customers to a company | NPS scores are measured with a single question survey and reported with a number from −100 to +100, a higher score is desirable. | Score 1: <5<br>Score 2: 5 < X < 50<br>Score 3: >50 | NPS Score |
| CSAT | Customer satisfaction score (CSAT) is a commonly used metric that acts as a key performance indicator for customer service and product quality in all kinds of businesses. | CSAT is a more defined metric that's expressed asa percentage. 100% would be the best. | Score 1: <0%<br>Score 2: 0% < X < 50%<br>Score 3: >50% | CSAT |

TABLE 7

Risk Parameter

| Metrics | Definition | Formula | Score | Queries |
|---|---|---|---|---|
| Resource risks | | | | |
| Environment risks | | | | |
| Niche or complex | | | | |
| Technology risks | | | | |
| New product | | | | |

Referring now to FIG. 6C, an EHI is calculated. Score engine 404 combined with data aggregation module 402 specifies a weight for each parameter at operation 660 and calculates the EHI based on the weights and composite scores for each parameter at operation 665. Data aggregation module 402 may adjust a weight for a parameter based on a project type, a project maturity level and other project requirements. In some embodiments, the EHI is a weighted average of parameters. Specifically, the EHI is a weighted composite number for a product based on the identified primary and secondary parameters. The primary parameters are gathered in real time using the data from execution lifecycle tools, and thus the EHI is updated with the most recent project progresses. The EHI also includes the dynamic risk information. Since some of the secondary parameters are measured directly and some are calculated using customer/team surveys, the EHI includes comprehensive project progress information and thus is accurate. Moreover, primary and secondary parameters may be curated based on industry and/or organization standard metrics (e.g., the eight metrics of the quality parameter as depicted in FIG. 8), and thus the implementation of EHI may be easily adapted into other projects and other project management systems.

A single EHI score is calculated based on composite scores for parameters and associated weights. FIG. 10 shows the calculation of EHI for two projects. EHI 1002 for project 1 is 1.5 and EHI 1004 for project 2 is 1.3, which may be calculated based on an equal weight (25%) assigned to each of parameters quality, scope, and schedule, weight 15% assigned to automation, and weight 10% assigned to agility. The weights of parameters may vary depending on which factors are critical to a specific project. For example, time to market is critical to a product prepared for Christmas holidays, and thus the parameter "Schedule" may be adjusted to carry a maximum weight (e.g., 35%). In another scenario, automation may be critical to a client where software build is daily deployed. As a result, an automation parameter is configured to have the maximum weight.

Because the composite scores of parameters are normalized to a scale, the EHI is also depicted on the scale for analysis. In the examples of the present disclosure, the EHI is on a three-point scale. In some embodiments, the EHI and data relevant to the calculation of the EHI are also stored in composite scores library 452.

Different levels of data-metric values, composite scores for parameters, and the EHI may provide meaningful insights and establish credibility for a project when these data/scores are interpreted and analyzed in a certain context. Referring back to FIG. 4, data analytics module 406 and recommendation module 408 are responsible for analyzing the data/scores and using a deterministic approach to provide recommendations. In some embodiments, data analytics module 406 may analyze the scores, e.g., based on statistics and probability analysis using a machine learning model, and generate one or more analytic reports (e.g., parameter movements, trend predication) based on the analysis. Data analytics module 406 either retrieves the scores from metrics library 450 and composite scores library 452 or receives the scores from scoring engine 404.

Figure 11A:
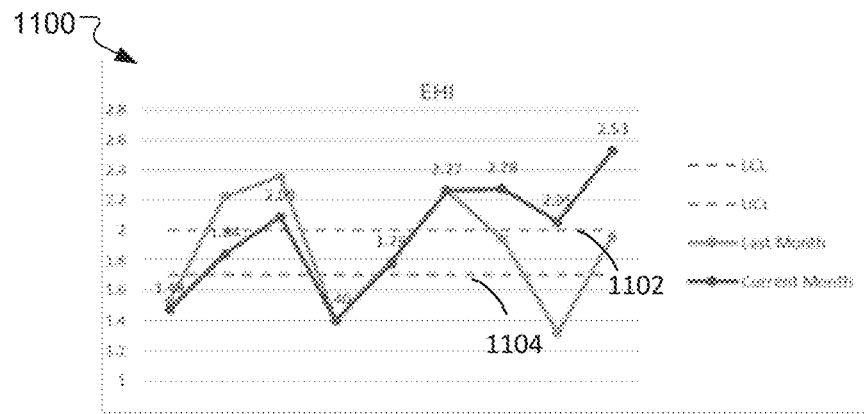
FIGS. 11A-11E are example views generated based on the analysis of different levels of scores, according to some embodiments.
Figure 11B:
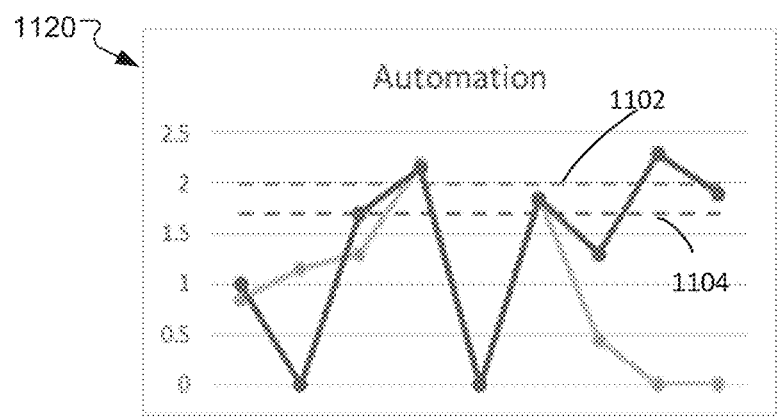
Figure 11C:
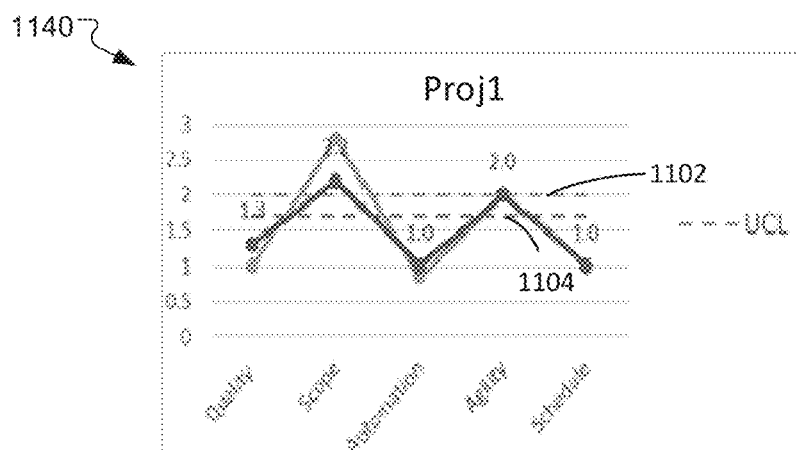
Figure 11D:
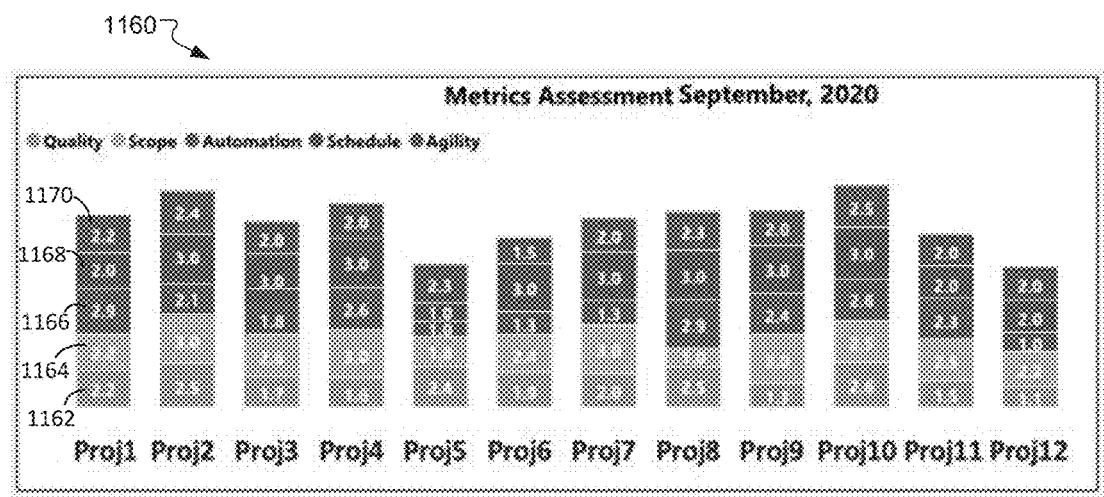
Figure 11E:
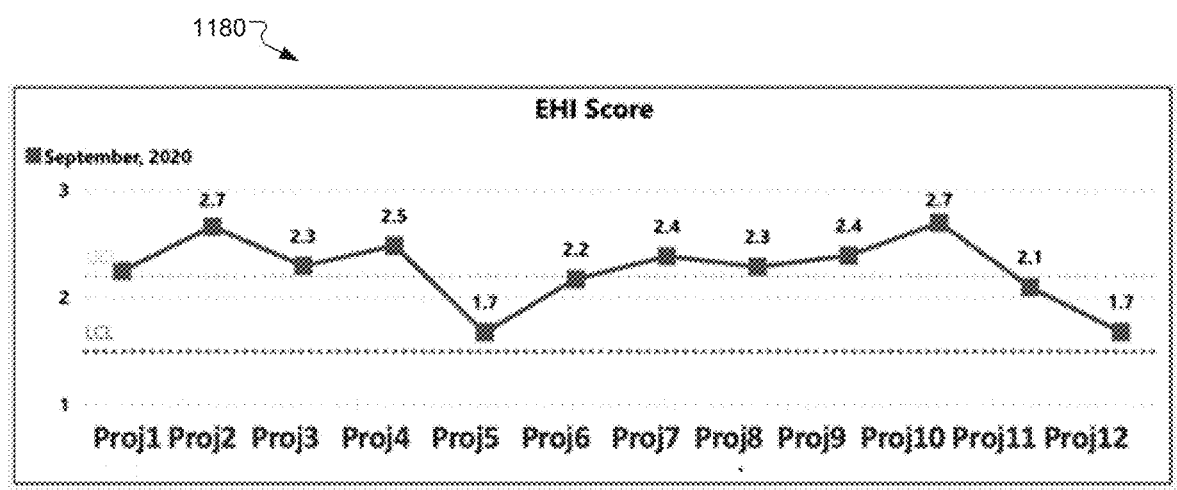

Data analytics module 406 may instruct data visualization module 410 to generate graphic interfaces for presenting analytic results to users based on the analysis of the scores and the analytic reports. In some embodiments, data analytics module 406 may store the analytic reports and different views/visualization generated based on the analytic reports in analytics library 454. FIGS. 11A-11E are example views generated based on the analysis of different levels of scores by data analytics module 406. These graphs may be plotted to show comparisons of EHI and parameter levels across products. These graphs may also be plotted for certain data across different time intervals (e.g., 3 months, 6 months) to obtain the movement of parameters across the timeline. FIG. 11A is a graph 1100 of the EHI scores obtained for a project in two consecutive months, where 1102 and 1104 each represents the UCL and LCL used for calculating the EHIs and other composite scores of parameters. FIG. 11B is a graph 1120 comparing the scores of an automation parameter within a time period (e.g., two months). FIG. 11C is a graph 1140 showing the parameter fluctuation over time. The parameters such as quality, scope, automation, agility, and schedule are used for calculating the EHI. FIG. 11D is a bar graph 1160 showing health assessment for 12 projects based on parameters including quality 1162, scope 1164, automation 1166, schedule 1168, and agility 1170. FIG. 11E is a graph 1180 comparing the EHI score for 12 projects. The EHI is a combination of individual parameter scores, which measures the risk in a project. If the EHI score is lower, the risk is higher, and vice versa.

Based on the analysis of different levels of scores, data analytics module 406 may provide different entry points for different users/reviewers of a project. In some embodiments, data analytics module 406 may analyze the execution health of the project in two ways by different personas: bottom up and top down. Data analytics module 406 organizes, structures, and presents the data into useful information in these views. The top-down view allows a user (e.g., an organization leader) to obtain an overview of the project and to filter down to lower levels of the data hierarchy for detailed explanations, while the bottom-up view leverages the lower-level data/scores for focused analysis and provides insights into day-to-day processes that the higher level users may not have visibility into. For example, EHI may provide drill-down views to the source data level as well as maintaining bottom up traceability to a final health index score.

The bottom-up view or top-down view is persona-based. In some embodiments, data analytics module 406 may determine a user role of a user/viewer and identify a bottom-up view or a top-down view to present to the user. The user role may indicate a user is an executive officer of an organization, a project manager, a member of an execution team, etc. In a bottom-up view, a user may see weekly/sprint/release/milestone reviews based on the analysis of a selection of metrics. The analysis at the bottom-up view usually focuses on contextual or distressed areas such as scope changes, defect bounce rate, etc. This is a relatively narrow or specific analysis. Also, the analysis is provided in real time based on real-time data collected from a project, e.g., through a management tool such as JIRA or VSTS. Further, the bottom-up view is persona-based, which may be available to users including a scrum leader, a quality leader, a release manager, or an engineering manager such that these users may look into the lowest level of data such as open defects, velocity, or scope progress, etc. Compared to the bottom-up view, a top-down view is based on the analysis of composite health index/scores. The top-down view may show cumulative scores that can be selected to drill down to individual metrics. For example, the top-down view may include only a single EHI score for a project. Personas including an executive leadership, engineering manager or release manager may be configured to get the insights of the project based on the top-down view.

Figure 12:
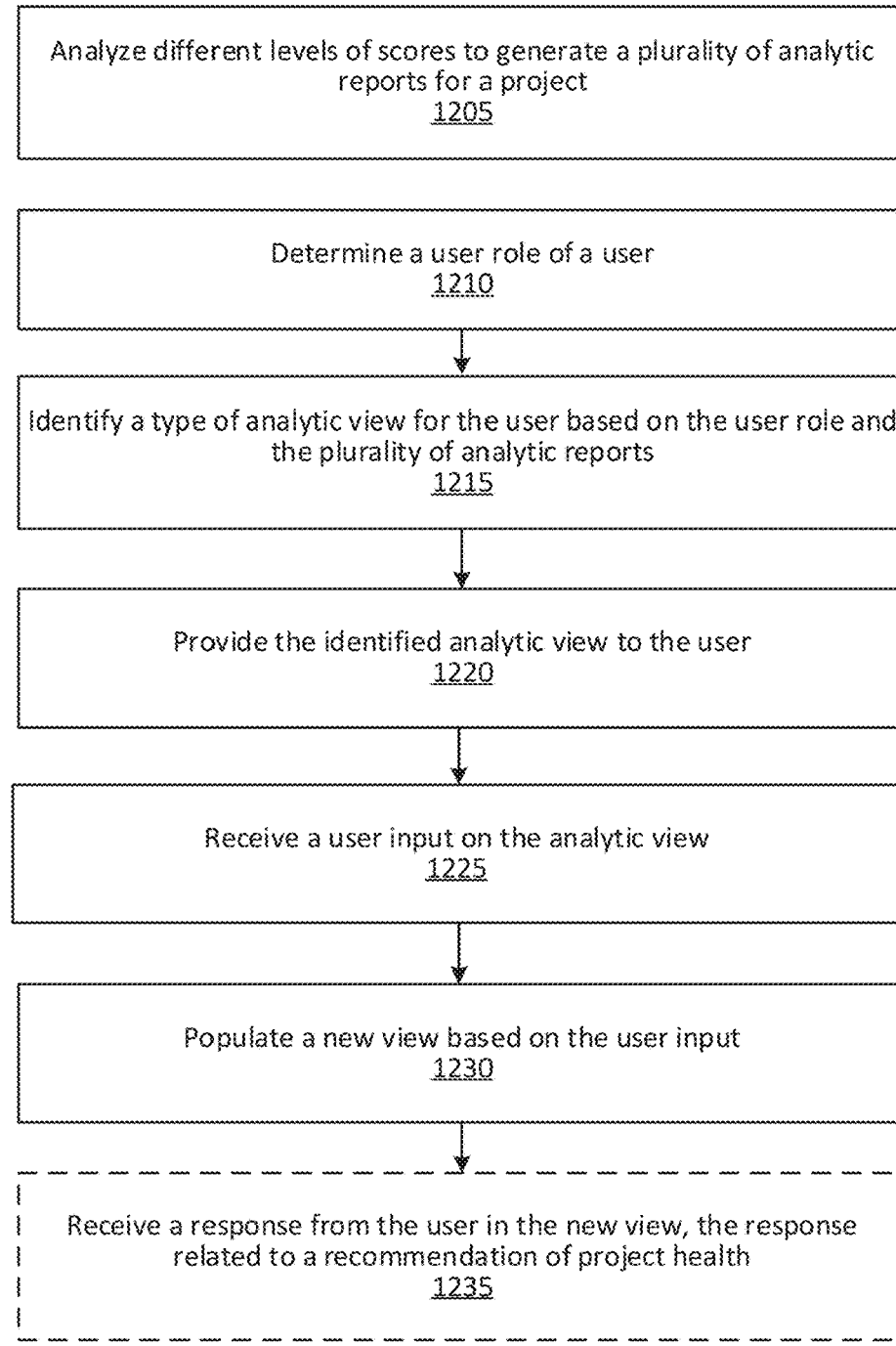
FIG. 12 is a flowchart of a method for presenting a bottom-up view or top-down view to a user, according to some embodiments.
Figure 13A:
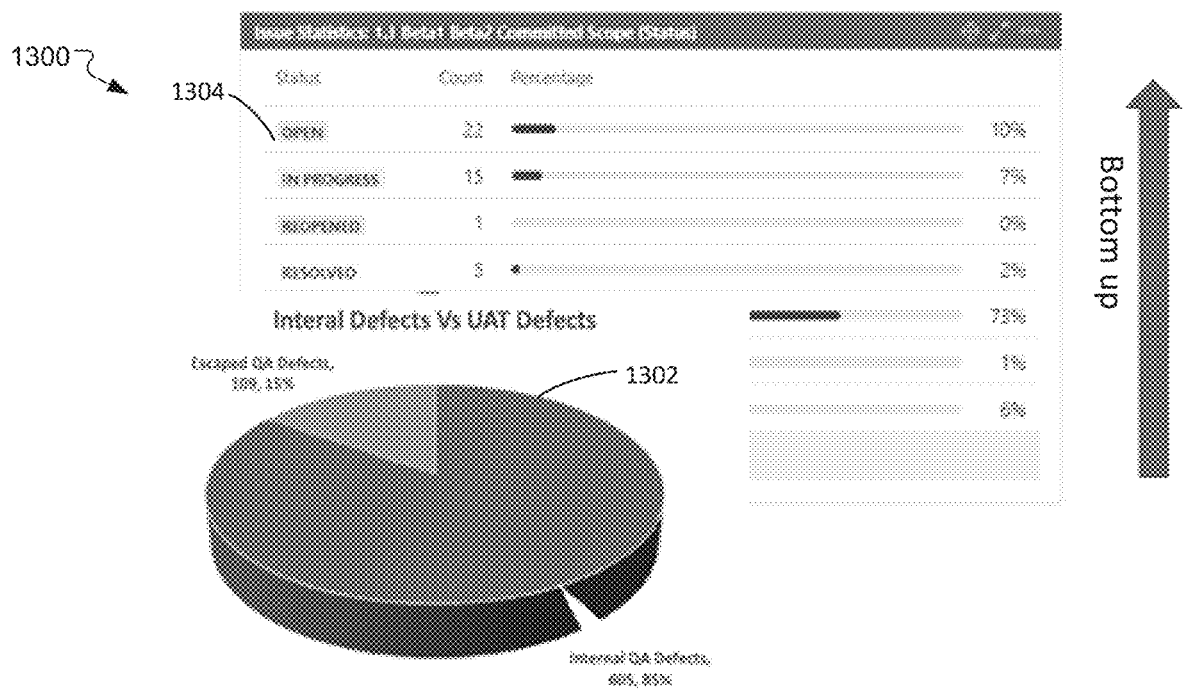
FIG. 13A shows an example bottom-up view, according to some embodiments.
Figure 13B:
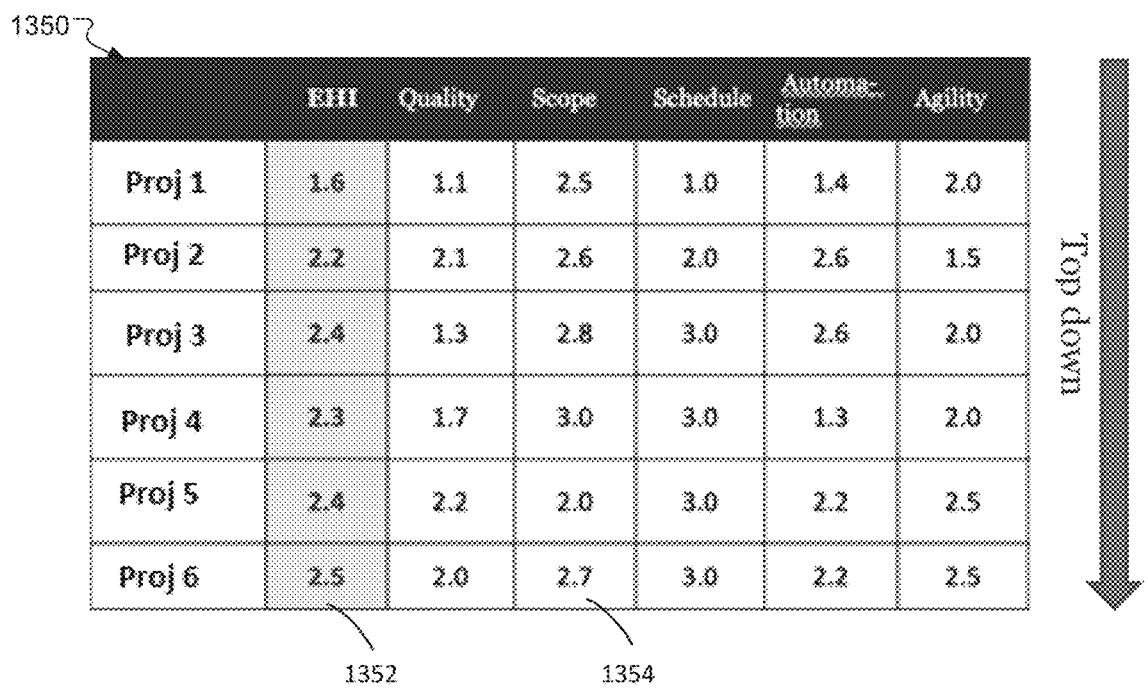
FIG. 13B shows an example top-down view, according to some embodiments.

FIG. 12 is a flowchart 1200 of a method for presenting a bottom-up view or top-down view to a user. At operation 1205, data analytics module 406 analyzes different levels of scores to generate a plurality of analytic reports for a project. For example, an analytic report may be a month-to-month report showing project health predictions of a project with respect to parameters such as scope and schedule based on the probability and statistical analysis. At operation 1210, data analytics module 406 determines a user role of a user. Based on the user role and the plurality of analytic reports, at operation 1215, data analytics module 406 identifies a type of analytic view for the user, e.g., a top-down view or a bottom-up view. At operation 1220, data analytics module 406 communicates with the data visualization module 410 to provide the identified analytic view to the user. An example bottom-up view 1300 is shown in FIG. 13A, where a user (e.g., an engineering leader) is presented the statistics 1302 of internal defects and user acceptance testing (UAT) defects, and the defect distribution status and data 1304. These statistical data help the user address specific problems such as "is the number of defects too high?" "is the defect processing too slow?" "which part has most defects?" In comparison, an example top-down view 1350 is shown in FIG. 13B, where a user (e.g., an executive leader) is presented merely EHI 1352 and corresponding parameters 1354. The numbers themselves are health indicators in certain aspects, but no detailed information related to a specific and narrow goal (e.g., whether open defects need to be reduced) is provided.

Responsive to one of the top-down view or bottom-up view presented to the user, the user may select to drill down to a next view to either obtain more information related to the project, or even provide useful information for developing the project. At operation 1225 of FIG. 12, a user input on the analytic view may be received, for example, a selection of an EHI or other composite score on a top-down view from an executive leader may be detected. As a response, at operation 1230, data analytics module 406 may populate a new view based on the user input. For example, the new view may be a detailed view such that the user may drill down to the lower level of data hierarchy (e.g., individual metrics) to identify problem area(s). Optionally, at operation 1235, data analytics module 406 may receive a response from the user in the new view, the response related to a recommendation of project health. In other words, in addition to passively receiving more information in the new view (e.g., narrower and deeper analysis with respect to metrics), a user may provide his/her insights to the project management. This allows an experienced leader or user to explicitly express precious and on-point comments in the system, which is particularly important in identifying an actionable recommendation to improve an area of the project.

In some embodiments, recommendation module 408 may analyze the scores at different levels (e.g., based on the drilling-down analysis as shown in FIGS. 11A-11E and 13A-13B) and identify an action to be taken to improve project health and reduce project risks. Each recommendation may provide a summary and suggestion for a further course of action. Since metrics, parameters, and EHI are categorized into different scales and form different levels of a data hierarchy, in some embodiments, recommendation module 408 may also provide the subsequent recommendations based on different scales for each of the different levels of scores.

Figure 14:
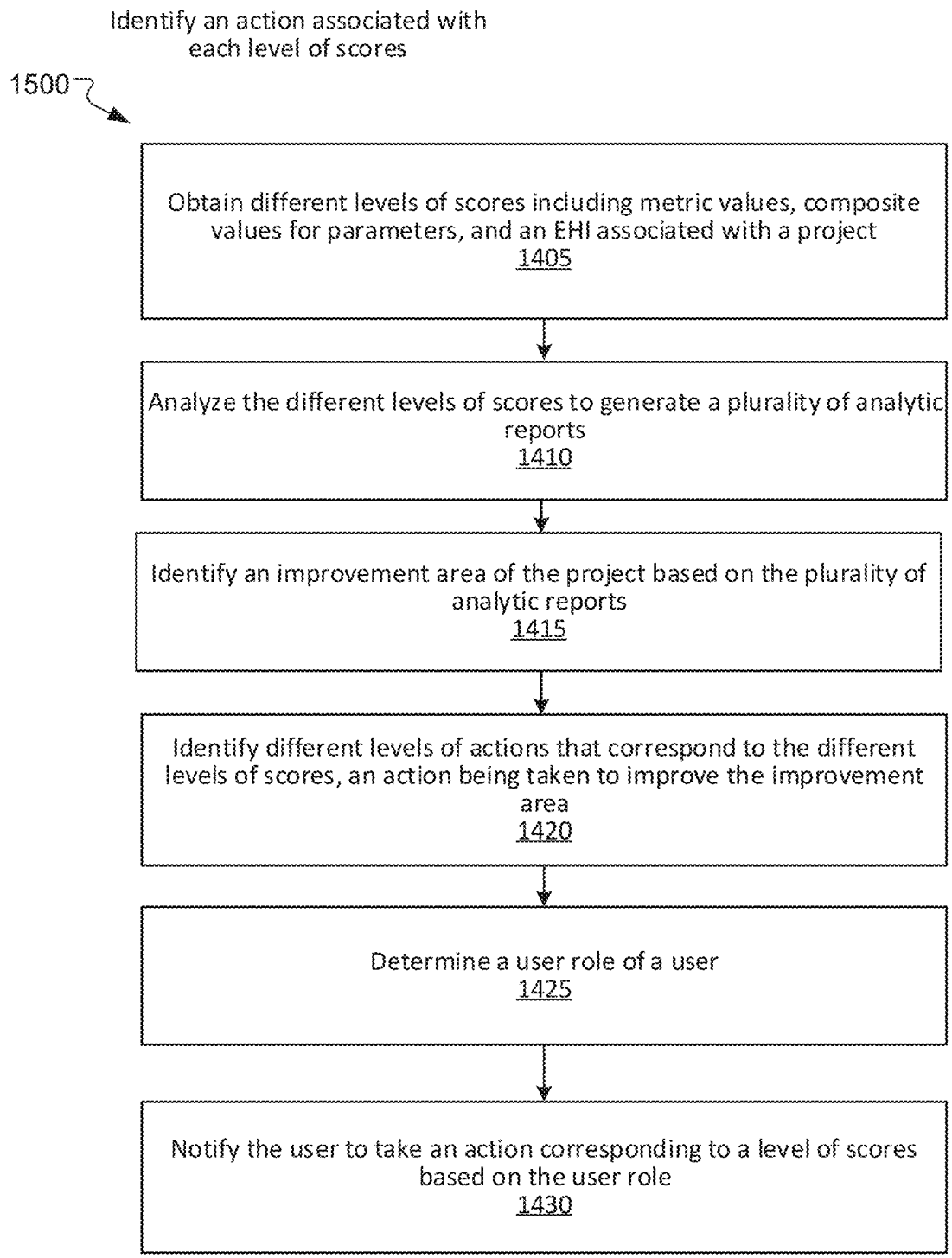
FIG. 14 is a flowchart of a method for identifying an action to improve an improvement area, according to some embodiments.

FIG. 14 is a flowchart of method 1400 for identifying an action to be taken to improve an improvement area. At operation 1405, recommendation module 408 obtains different levels of scores including metric values, composite values for parameters, and an EHI associated with a project (as shown in FIGS. 8-10). At operation 1410, recommendation module 408 analyzes the different levels of scores to generate a plurality of analytic reports, e.g., based on statistics and probability analysis using a machine learning model. The machine learning model may be a regression model, SVM model, k-means clustering model, CNN model, etc.

At operation 1415, recommendation module 408 identifies an improvement area of the project based on the plurality of analytic reports. The improvement area may include a troublesome feature or a step needing further development. Recommendation module 408 may identify an area to be improved using a set of rules (e.g., if a parameter is below a predefined threshold). In some embodiments, recommendation module 408 may prioritize potential improvement areas and focus on an improvement area that is both important and frustrating.

At operation 1420, recommendation module 408 identifies different levels of actions that correspond to the different levels of scores. Each action is taken to improve the improvement area. For example, recommendation module 408 may identify first action(s) based on the EHI, second action(s) based on the parameters corresponding to the EHI, and third action(s) based on the metrics corresponding to each parameters. At operation 1425, recommendation module 408 determines a user role of a user. At operation 1430, recommendation module 408 along with data visualization module 410 notifies the user to take an action corresponding to a level of scores based on the user role. In some embodiments, recommendation module 408 may communicate with data visualization module 410 to generate and display a notification of the action(s) on a mobile device (e.g., mobile device 304) associated with the user (e.g., user 306) based on the user role of the user. In some embodiments, recommendation module 408 also stores the hierarchical actions and other data relevant to determining the hierarchical actions (e.g., user role associated with a user) in recommendation library 456.

The hierarchical actions allow users with different roles at different levels to take a best action to improve an improvement area. For example, when addressing a same issue, recommendation module 408 is able to tell a software engineer to take a different action than the chief executive officer so that each user may take correction actions at a right time. Example hierarchical actions are shown in the below tables 8-10.

TABLE 8

EHI Based Recommendations

| Improvement | Recommendations |
| --- | --- |
| Score < 1.5 | Frequent (e.g., weekly) governance calls involving leadership<br>Daily/weekly meetings with engineering and offering management lead to identify bottlenecks and dependencies |
| 1.6-2.3 | Monthly governance call to check on progress and resolve bottlenecks and dependencies |
| Score > 2.4 | Monthly reports to be shared. Meetings can be arranged on ad-hoc basis |

TABLE 9

Parameter Based Recommendations

| Improvement | Recommendations |
| --- | --- |
| | Quality |
| Score < 1.5 | Pay attention to unit test coverage<br>Reduce defect backlog by in-sprint testing, invest time in Bug Bashing (Stop feature development and put everyone for testing and fixing bugs)<br>Setup Quality Council to monitor product quality closely |
| 1.6-2.3 | Focus on regression automation |
| Score > 2.4 | Pay attention to continuous delivery keeping security, compliance defects in check |
| | Schedule |
| Score < 1.5 | Re-define MVP based on team's velocity<br>Notify customers and redefine schedule<br>Add resources |
| 1.6-2.3 | Clearly defined acceptance criteria helps in timely delivery<br>Identify delays and proactively remove impediments<br>Identify cross-dependencies and improve cross-team collaboration |

TABLE 9-continued

Parameter Based Recommendations

| Improvement | Recommendations |
| --- | --- |
| Score > 2.4 | Monitor any deviations<br>Track impediments |
| | Scope |
| Score < 1.5 | Availability of high-level roadmap for future releases<br>Set backlog refinement cadence to clarify scope |
| 1.6-2.3 | Ensure availability of detailed roadmap for current release<br>Clearly defined acceptance criteria in stories and features |
| Score > 2.4 | Constant feedback from stakeholders through sprint/release demos looped into backlog |

TABLE 10

Metrics Based Recommendations

| Improvement | Recommendations |
| --- | --- |
| | Quality |
| High Open Defects | Triage calls to identify the defects to be prioritized and remove from backlog if required |
| High Bounce rate | Perform RCA for reopened defects |
| Low Unit test coverage | Unit test coverage improvement |
| | Schedule |
| Schedule is off track | Commitment as per team's velocity<br>Product managements involvement in defining MVP Clear acceptance criteria |
| | Scope |
| Roadmap availability | Clarity Short-term and long term vision |
| Low Story completion ratio | Identify team's velocity and commit as per team's Velocity |
| Variability in velocity | Adjust team composition to maintain cross-functional |
| Trend | Nature |

Figure 15:
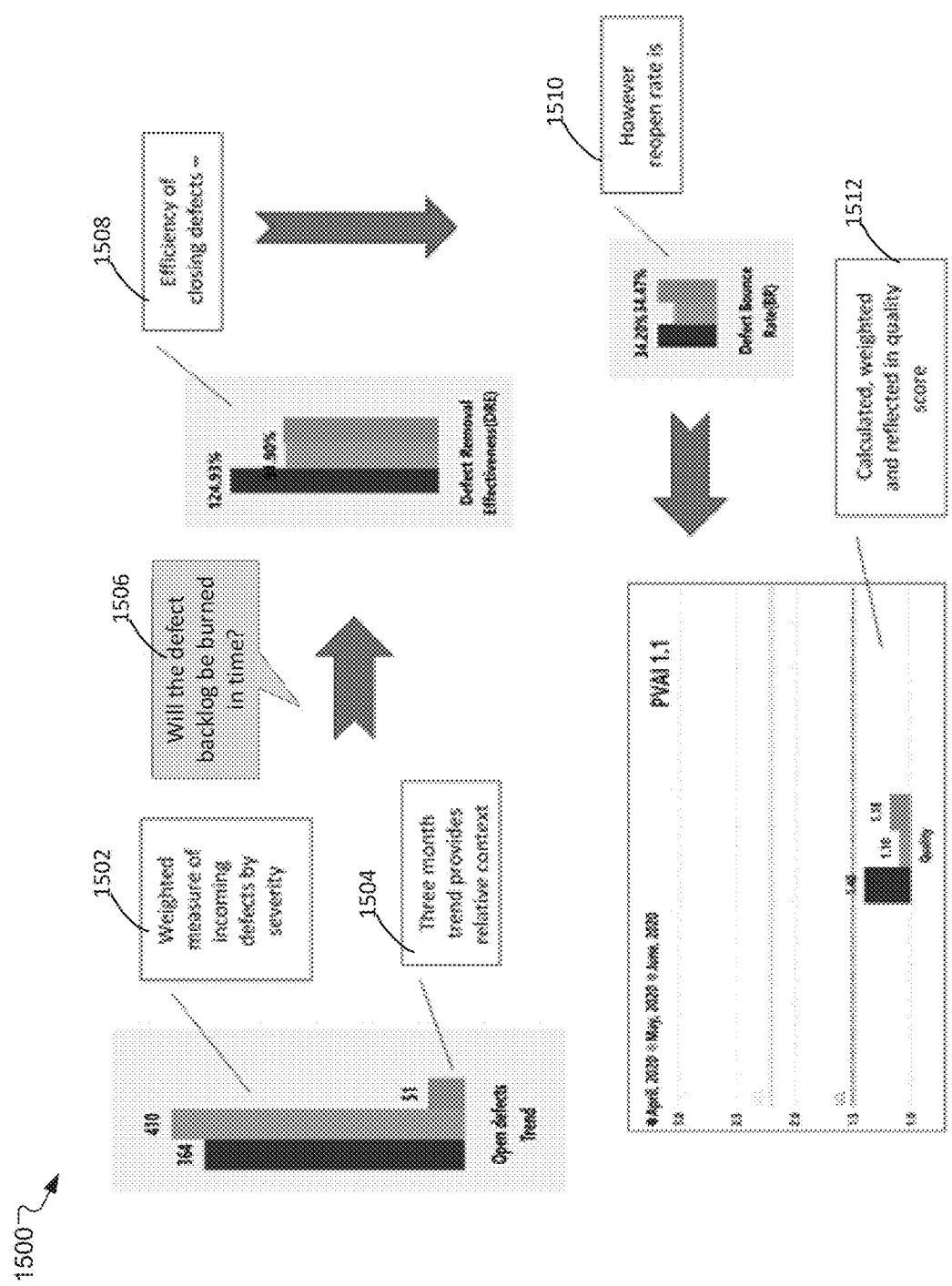
FIG. 15 is an example view showing a procedure of assessing and improving project health, according to some embodiments.

FIG. 15 is an example view 1500 showing a procedure of assessing and improving project health. Metric data can uncover hidden issues. As in 1502 and 1504, a three-month trend of the metric "open defect" is plotted, which shows the backlog problem of a project. In other words, the improvement area is whether the defect backlog can be burned in time in 1506. To find the actions to reduce the defect backlog, other factors such as efficiency of closing defects in 1508 and reopen rate of defects in 1510 are considered. One or more actions are identified based on the analysis of 1502, 1504, 1508 and 1510. The quality prediction based on such analysis is shown in 1512. The month-to-month quality trend 1512 gives insight on the progress and helps track project health and risks. Depending on the identified actions and whether the actions have been timely taken, the quality prediction 1512 may vary.

Responsive to identifying the hierarchical actions, in some embodiments, recommendation module 408 may integrate with other systems to ensure that each action can be timely taken. For example, the recommended action may be integrated with a system of record such as enterprise resource planning (ERP) application to take real time actions based on the recommended actions.

Figure 16:
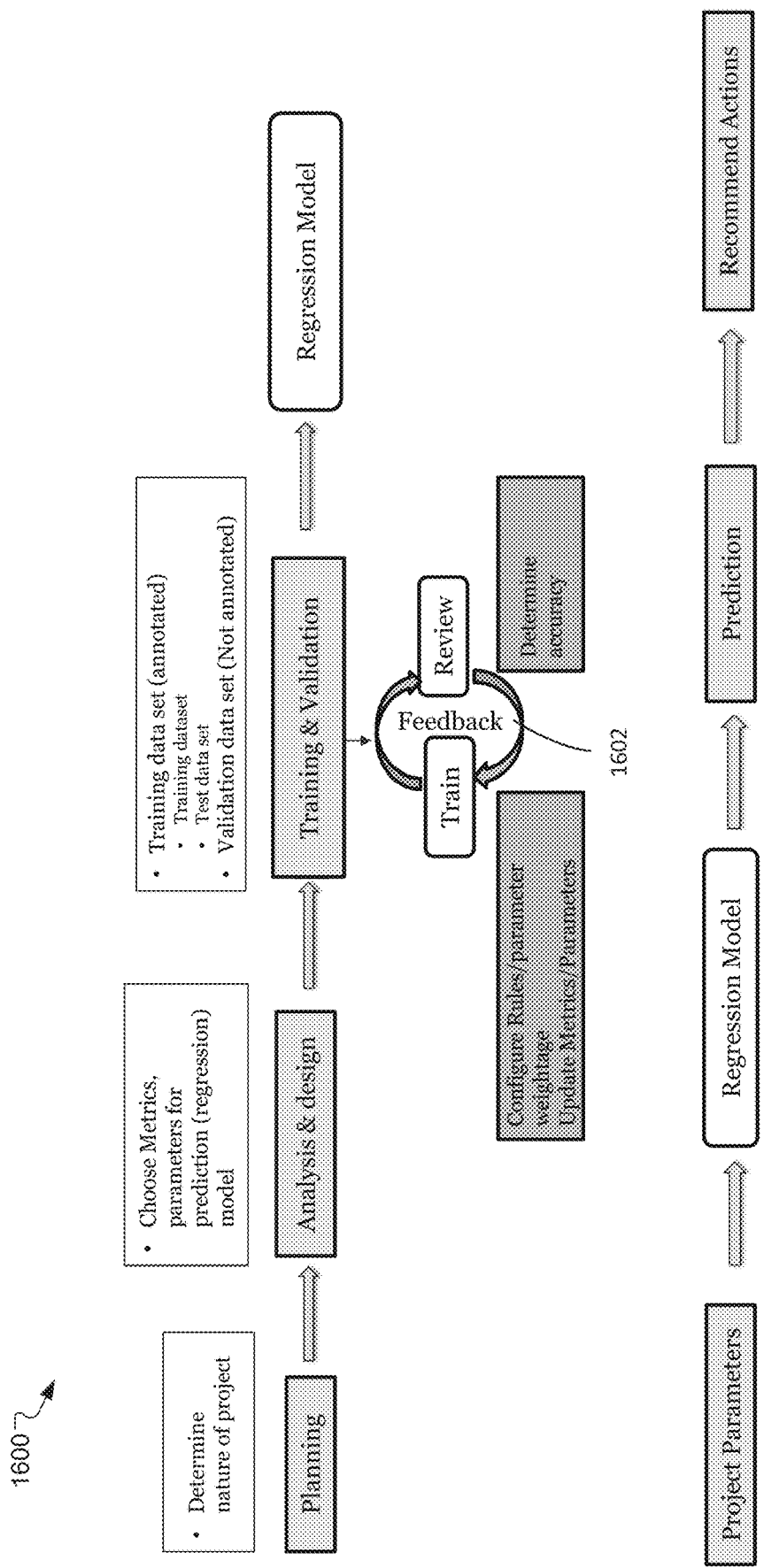
FIG. 16 illustrates a high level procedure for training one or more artificial intelligence (AI)/machine learning (ML) models

FIG. 16 illustrates a high level procedure 1600 for training one or more artificial intelligence (AI)/machine learning (ML) models. The AI/ML models can be trained based on different metrics and parameters periodically (e.g., month on month) to predict the course of a project. As shown in the example of FIG. 16, one or more regression models are trained. In some embodiments, the models are trained by data analytics module 406 in communication with other components of system 300, and model information (e.g., training data, parameter updates, etc.) may be stored in optional model library 458. Based on the nature of the project, the training of the one or more models may provide one or more recommendations. Based on the accuracy of a recommendation, a feedback mechanism 1602 for model enhancement can take place. These prediction can help the project modify weightage/addition of metrics. This will also help different stakeholders to identify issues early and take appropriate recommended actions.

The actions recommended to improve an improvement area are dynamic. In some embodiments, data analytics module 406 may train an AI or machine learning model based on an actual improvement from the implementation of the actions and in turn instruct recommendation module 408 to adjust the actions to be taken to make further improvement. For example, if an action has been taken by a user, the new metric data may be collected and added to the machine learning model for training. Based on training the machine learning model, data analytics module 406 may adjust one or more parameters of the machine learning model such as one or more weights associated with one or more metrics and parameters. The adjustment of the model/weights affects the calculation of the metric values, composite scores for parameters, and EHI. The newly calculated different levels of scores may then be looped back to recommendation module 408 for determining and/or adjusting the hierarchical actions to be taken to help advancement of an improvement area. In this way, a continuous data-insight-action loop is established to improve project health and reduce project risks.

ADDITIONAL CONSIDERATIONS

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component.

Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated and described with the figures above. Modules may constitute either software modules (e.g., code embodied on a machine-readable medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processors) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, include processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that includes a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" is employed to describe elements and components of the embodiments herein. This is done merely for convenience and to give a general sense of the claimed invention. This description should be read to include one or at least one and the singular also includes the plural unless it is obvious that it is meant otherwise.

Upon reading this disclosure, those of skill in the art will appreciate still additional alternative structural and functional designs for the system described above. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for providing persona-based analysis in a project management system, the method comprising:
    identifying and monitoring a plurality of metrics for a plurality of projects, the plurality of metrics including a first set of metrics associated with a first project of the plurality of projects;
    training one or more machine learning (ML) models based on the plurality of metrics associated with the plurality of projects;
    using the trained one or more ML models,
        calculating health indicator scores for the plurality of projects based on the plurality of metrics including determining a first score for the first project based on the first set of metrics;
        identifying a first action corresponding to the first score, the first action including identifying and monitoring an additional second set of metrics associated with the first project based on the first score and timing and frequency used to monitor the first set of metrics;
        identifying and providing a first type of analytic view associated with the first score for the first user based on a first user role of the first user;
        calculating a second score for the first project based at least on the first score and the additional second set of metrics identified and monitored responsive to determining the first score; and
        generating a second type of analytic view associated with the second score based on the second score being associated with a different level than the first score;
    providing the second type of analytic view to the second user based on a second user role of the second user;
    returning one or more of the health indicator scores, the first action, and the first type of analytic view to the one or more ML models to refine the one or more ML models; and
    adjusting one or more actions notified to users based on the refined ML models.

2. The method of claim 1, wherein the health indicator scores comprise metric values and composite scores, and the composite scores comprise an execution health index (EHI) and scores for each parameter that assess performance of the first project.

3. The method of claim 2, wherein calculating the health indicator scores comprises:
    collecting data of the plurality of projects based on the plurality of metrics;
    customizing each metric associated with each parameter based on the collected data; and
    calculating a value for each metric associated with each parameter.

4. The method of claim 3, wherein calculating the health indicator scores comprises:
    specifying a scale for normalizing each metric associated with each parameter;
    normalizing the value of each metric to the scale;
    specifying a weight for each metric associated with each parameter; and
    calculating a composite score for each parameter.

5. The method of claim 4, wherein calculating the health indicator scores comprises:
    specifying a weight for each parameter; and
    calculating the EHI based on weights and composite scores associated with each parameter.

6. The method of claim 1, wherein the first project includes different stages of a product lifecycle, and the lifecycle includes at least development and implementation of the product.

7. The method of claim 1, wherein identifying and monitoring the plurality of metrics is based on project requirements, the method further comprising:
    expanding or reducing the plurality of metrics based on a dynamic change of the project requirements.

8. The method of claim 1, wherein, responsive to providing the first analytic view to the first user, the method further comprises:

receiving a user input on the first analytic view;
populating a new view based on the user input; and
receiving a response from the first user in the new view, the response being related to a recommendation of project health.

9. The method of claim 1, wherein the first analytic view comprises at least one of a bottom-up view and a top-down view.

10. The method of claim 1, further comprising identifying an improvement area of the first project based on analyzing the health indicator scores.

11. A project management system for providing persona-based analysis, the system comprising:
a server comprising:
a project management application; and
data storage units communicatively coupled to the project management application;
a network communicatively coupled to the server;
a software application running on an electronic device communicatively coupled via the network to the server; and
wherein the project management application is configured to:
identify and monitor a plurality of metrics for a plurality of projects, the plurality of metrics including a first set of metrics associated with a first project of the plurality of projects;
train one or more machine learning (ML) models based on the plurality of metrics associated with the plurality of projects;
based on the trained one or more ML models,
calculate health indicator scores for the plurality of projects based on the plurality of metrics including determining a first score for the first project based on the first set of metrics;
identify a first action corresponding to the first score, the first action including identifying and monitoring an additional second set of metrics associated with the first project based on the first score and timing and frequency used to monitor the first set of metrics;
identify and provide a first type of analytic view associated with the first score for the first user based on a first user role of the first user;
calculate a second score for the first project based at least on the first score and the additional second set of metrics identified and monitored responsive to determining the first score; and
generate a second type of analytic view associated with the second score based on the second score being associated with a different level than the first score;
provide the second type of analytic view to the second user based on a second user role of the second user;
return one or more of the health indicator scores, the first action, and the first type of analytic view to the one or more ML models to refine the one or more ML models; and
adjust one or more actions notified to users based on the refined ML models.

12. The system of claim 11, wherein the health indicator scores comprise metric values and composite scores, and the composite scores comprise an execution health index (EHI) and scores for each parameter that assess performance of the first project.

13. The system of claim 12, wherein, to calculate the health indicator scores, the project management application is further configured to:
collect data of the plurality of projects based on the plurality of metrics;
customize each metric associated with each parameter based on the collected data; and
calculate a value for each metric associated with each parameter.

14. The system of claim 13, wherein, to calculate the health indicator scores, the project management application is further configured to:
specify a scale for normalizing each metric associated with each parameter;
normalize the value of each metric to the scale;
specify a weight for each metric associated with each parameter; and
calculate a composite score for each parameter.

15. The system of claim 14, wherein, to calculate the health indicator scores, the project management application is further configured to:
specify a weight for each parameter; and
calculate the EHI based on weights and composite scores associated with each parameter.

16. The system of claim 11, wherein the first project includes different stages of a product lifecycle, and the lifecycle includes at least development and implementation of the product.

17. The system of claim 11, wherein, responsive to providing the first analytic view to the user, the project management application is further configured to:
receive a user input on the first analytic view;
populate a new view based on the user input; and
receive a response from the first user in the new view, the response being related to a recommendation of project health.

18. The system of claim 11, wherein the first analytic view comprises at least one of a bottom-up view and a top-down view.

19. A computer program product for providing persona-based analysis in a project management system, the computer program product comprising a non-transitory computer-readable medium having computer readable program code stored thereon, the computer readable program code configured to:
identify and monitor a plurality of metrics for a plurality of projects, the plurality of metrics including a first set of metrics associated with a first project of the plurality of projects;
train one or more machine learning (ML) models based on the plurality of metrics associated with the plurality of projects;
based on the trained one or more ML models,
calculate health indicator scores for the plurality of projects based on the plurality of metrics including determining a first score for the first project based on the first set of metrics;
identify a first action corresponding to the first score, the first action including identifying and monitoring an additional second set of metrics associated with the first project based on the first score and timing and frequency used to monitor the first set of metrics;
identify and provide a first type of analytic view associated with the first score for the first user based on a first user role of the first user;
calculate a second score for the first project based at least on the first score and the additional second set of metrics identified and monitored responsive to determining the first score; and generate a second type of analytic view associated with the second score based on the second score being associated with a different level than the first score;

provide the second type of analytic view to the second user based on a second user role of the second user;

return one or more of the health indicator scores, the first action, and the first type of analytic view to the one or more ML models to refine the one or more ML models; and adjust one or more actions notified to users based on the refined ML models.

20. The method of claim 1, further comprising:

displaying graphical representations of scores of a set of the plurality of metrics in additive proximity to form a combined visual assessment of the first project of the plurality of projects; and displaying graphical representations of scores of the set of metrics in additive proximity to form a combined visual assessment of a second project of the plurality of projects, wherein the combined visual assessment of the first project and the combined visual assessment of the second project are graphically juxtaposed to facilitate a comparison thereof.

* * * * *